US012121941B2

(12) United States Patent
Hovde

(10) Patent No.: US 12,121,941 B2
(45) Date of Patent: Oct. 22, 2024

(54) OIL AND WASTE SPILLAGE CONTAINMENT

(71) Applicant: Getty Box Gizmo LLC, Dickinson, ND (US)

(72) Inventor: Arthur M. Hovde, West Dickinson, ND (US)

(73) Assignee: Getty Box Gizmo LLC, Dickinson, ND (US)

(*) Notice: Subject to any disclaimer, the term of this patent is extended or adjusted under 35 U.S.C. 154(b) by 176 days.

(21) Appl. No.: 17/757,107

(22) PCT Filed: Dec. 14, 2020

(86) PCT No.: PCT/US2020/064962
§ 371 (c)(1),
(2) Date: Jun. 9, 2022

(87) PCT Pub. No.: WO2021/119634
PCT Pub. Date: Jun. 17, 2021

(65) Prior Publication Data
US 2023/0330722 A1    Oct. 19, 2023

Related U.S. Application Data

(60) Provisional application No. 63/008,638, filed on Apr. 10, 2020, provisional application No. 62/947,324, filed on Dec. 12, 2019.

(51) Int. Cl.
| | | |
|---|---|---|
| *B67C 11/02* | (2006.01) | |
| *B08B 17/02* | (2006.01) | |
| *B25H 3/02* | (2006.01) | |
| *F16N 31/02* | (2006.01) | |

(52) U.S. Cl.
CPC ............ *B08B 17/025* (2013.01); *B25H 3/02* (2013.01); *B67C 11/02* (2013.01); *F16N 31/02* (2013.01)

(58) Field of Classification Search
CPC ................................. B67C 11/02; F16N 31/02
USPC ....................................................... 141/86, 87
See application file for complete search history.

(56) References Cited

U.S. PATENT DOCUMENTS

| | | | |
|---|---|---|---|
| 4,099,598 | A | 7/1978 | Clinard |
| 4,460,105 | A | 7/1984 | Cox |
| 4,971,225 | A | 11/1990 | Bravo |
| 5,313,991 | A | 5/1994 | Murray |
| 5,379,810 | A | 1/1995 | Marino |
| D365,353 | S | 12/1995 | Brewer |
| D374,447 | S | 10/1996 | Brewer |
| D379,097 | S | 5/1997 | Brewer |
| 5,641,007 | A * | 6/1997 | Falk ...................... B44D 3/125 206/362.1 |

(Continued)

OTHER PUBLICATIONS

International Search Report and Written Opinion in International Application No. PCT/US2020/064962, dated Mar. 2, 2021, 15 pages.

*Primary Examiner* — Jason K Niesz
(74) *Attorney, Agent, or Firm* — Todd R. Fronek; Larkin Hoffman Daly & Lindgren, Ltd.

(57) ABSTRACT

Concepts presented herein relate to containment methods, systems and apparatus to assist in preventing oil and waste spillage during loading and unloading of fluid to and from a container assembly. The container assembly includes a container and a lid coupled with the container. A fluid delivery component is coupled to an interior of the lid and is positioned to direct fluid into the container.

19 Claims, 32 Drawing Sheets

(56) References Cited

U.S. PATENT DOCUMENTS

| | | |
|---|---|---|
| D380,814 S | 7/1997 | Brewer |
| 5,647,412 A | 7/1997 | Brewer |
| 7,469,784 B1 * | 12/2008 | Bower .................. F16N 31/002 |
| | | 141/319 |
| 7,673,658 B1 | 3/2010 | Brewer |
| 7,921,884 B2 | 4/2011 | Brewer |
| 8,286,790 B1 * | 10/2012 | McBryar ................ B44D 3/006 |
| | | 206/209 |
| 8,317,057 B2 * | 11/2012 | West ..................... B44D 3/006 |
| | | 220/571.1 |
| 8,365,817 B2 | 2/2013 | Brewer |
| 9,151,428 B2 | 10/2015 | Brewer |
| 9,920,586 B2 | 3/2018 | Brewer |
| 10,287,862 B2 | 5/2019 | Brewer |
| 2005/0269327 A1 | 12/2005 | Chafe |
| 2013/0134172 A1 | 5/2013 | Brewer et al. |
| 2015/0305531 A1 | 10/2015 | Milan |

* cited by examiner

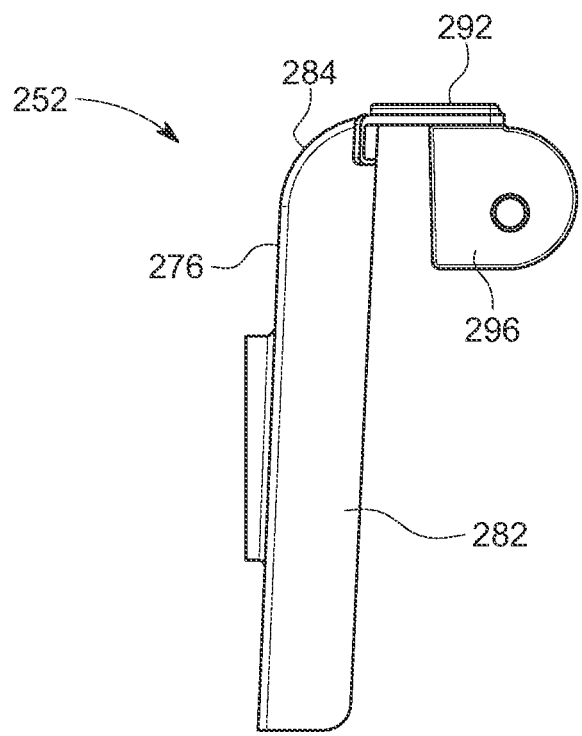
FIG. 25
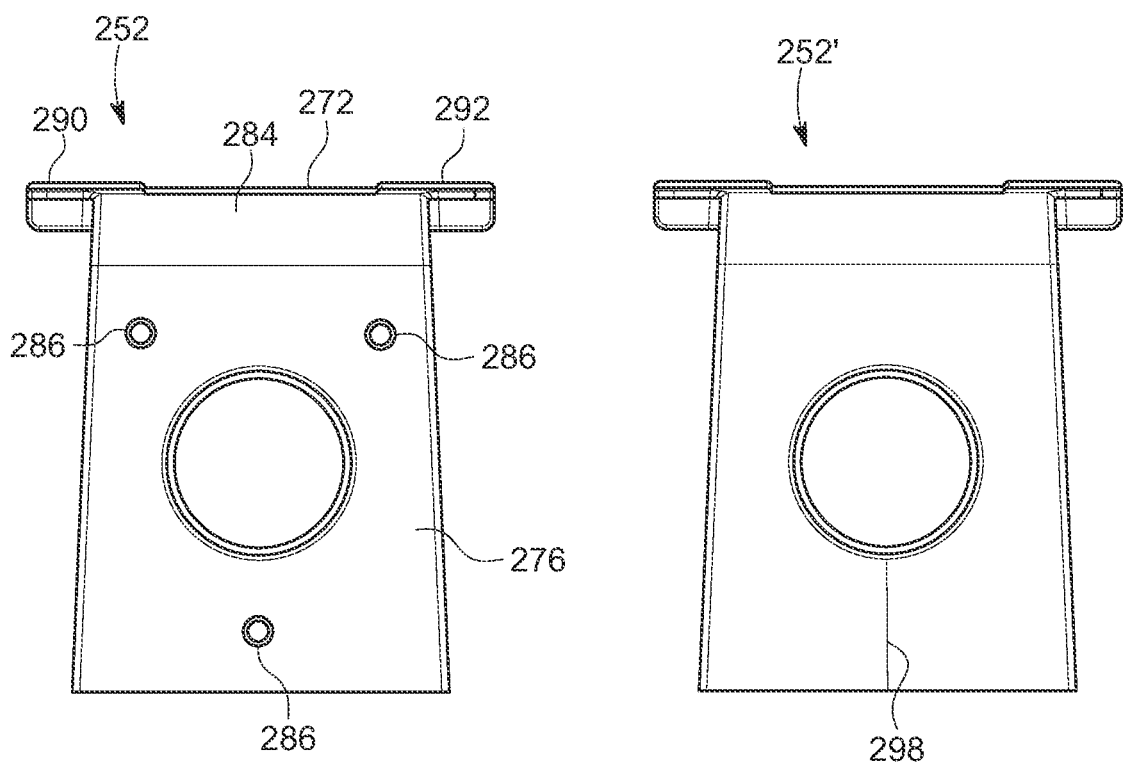
FIG. 26
FIG. 27

OIL AND WASTE SPILLAGE CONTAINMENT

BACKGROUND

Current load line containment assemblies are used in transferring oil from a first container to a second container. These assemblies include a lid and a container for receiving one or more connections. Some current assemblies include connections to both a supply line and a transfer line, while other assemblies include a single connection. In some instances, users of the assemblies use one or more tools in connecting a line to the containment assembly. These tools often contact fluid (e.g., oil, waste) during transfer and as a result the tools can spill fluid on the ground.

SUMMARY

Concepts presented herein relate to containment methods, systems and apparatus to assist in preventing oil and waste spillage during loading and unloading of oil to and from a container assembly. The container assembly includes a container and a lid coupled with the container. A fluid delivery component is coupled to an interior of the lid and is positioned to direct fluid into the container.

BRIEF DESCRIPTION OF THE DRAWINGS

FIG. 25 is a side view of the cover assembly in the load line containment assembly of FIG. 19.

FIG. 26 is a front view of the cover assembly in the load line containment assembly of FIG. 19.

FIG. 27 is a front view of an alternative cover assembly.

DESCRIPTION

Figure 1:
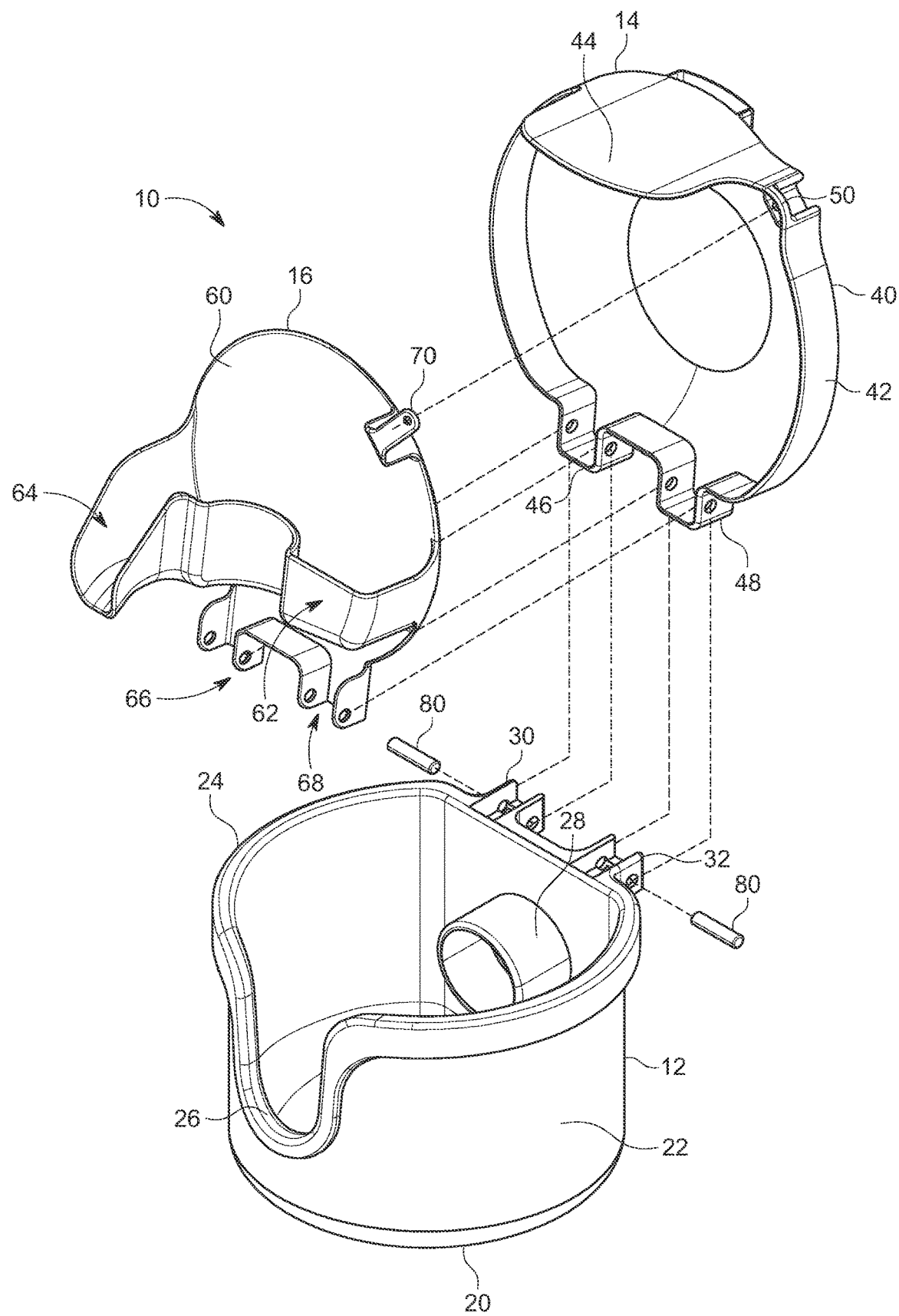
FIG. 1 is an exploded perspective view of a load line containment assembly having a tool storage device incorporating a fluid delivery component.

FIG. 1 is an exploded perspective view of an example load line containment assembly 10, which includes a container 12, a lid 14 and a tool storage device 16. Assembly 10 is configured to accept connections thereto when loading/unloading oil, acid and/or other hazardous waste from/to a vessel (e.g., a storage container, tank truck). In the embodiment illustrated, the lid 14 and tool storage device 16 are coupled together and configured to pivot with respect to the container 12. As discussed below, a fluid delivery component can be incorporated into the tool storage device 16 and connected to the lid 14 to direct oil from an interior side of the lid to the container 12. In one embodiment, containment assembly 10 can include features as disclosed in U.S. Pat. No. 9,151,428, the contents of which are hereby incorporated by reference in their entirety.

The container 12 in one embodiment is formed of a unitary body, which forms a bottom 20 surrounded by an upwardly extending wall 22. The wall 22 extends from the bottom 20 to an upward opening 24 and further defines a line support 26 and a collar support 28. The collar support 28, in one embodiment, forms a pipe that receives a first connection (e.g., from a supply line) and a second connection (e.g., from a transfer line). In other embodiments, the collar support 28 can be eliminated. The container 12 further defines first and second hinge support portions 30 and 32.

The lid 14 includes a top cover 40, a perimeter wall 42, a bill 44 and first and second hinge support portions 46 and 48. The cover 40 and perimeter wall 42 are sized to engage the opening 24 of the container 12 and prevent entry of contaminants and other objects (e.g., debris, animals) into the container 12. The bill 44 extends downward from the wall 42 to cover the line support 26. The lid 14 can also include a connecting portion 50 configured to receive a fastener to secure tool storage device 16 to lid 14.

Tool storage device 16, in one embodiment, is a unitary body that includes a base component 60, a tool support component 62, a fluid delivery component 64 and hinge support portions 66 and 68. The base component 60 is generally planar and is positioned adjacent the lid 14. The tool support component 62 and fluid delivery component 64 extend away from the base 60 and toward an internal volume of the container 12. The tool support component 62 is sized and configured to hold a hose connector thereon and collect any fluid (e.g., oil or waste spillage) that may drip from the connector. The tool support component 62 is integral with the fluid delivery component 64 to direct fluid into the internal volume of the container 12. A connecting arm 70, extending from the base component 60, can be secured to the connection portion 50 (e.g., with a fastener) to provide further connection between the tool storage device 16 and the lid 14. Although illustrated wherein lid 14 and tool storage device 16 are formed of separate members, in an alternative embodiment, the lid 14 and tool storage device 16 can be formed of a single unitary body as desired.

Figure 2:
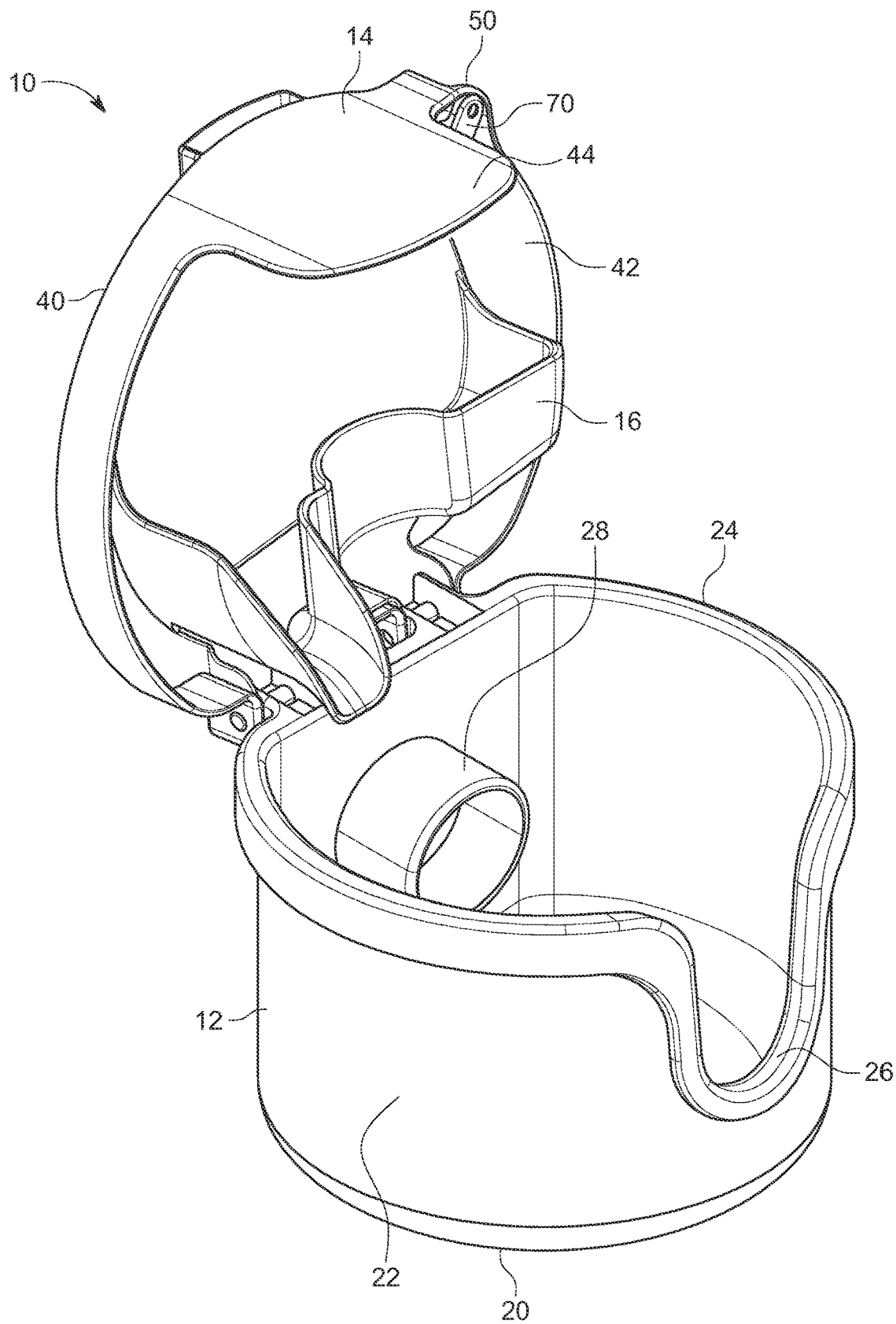
FIG. 2 is a perspective view of the assembly of FIG. 1 in an assembled configuration.
Figure 3:
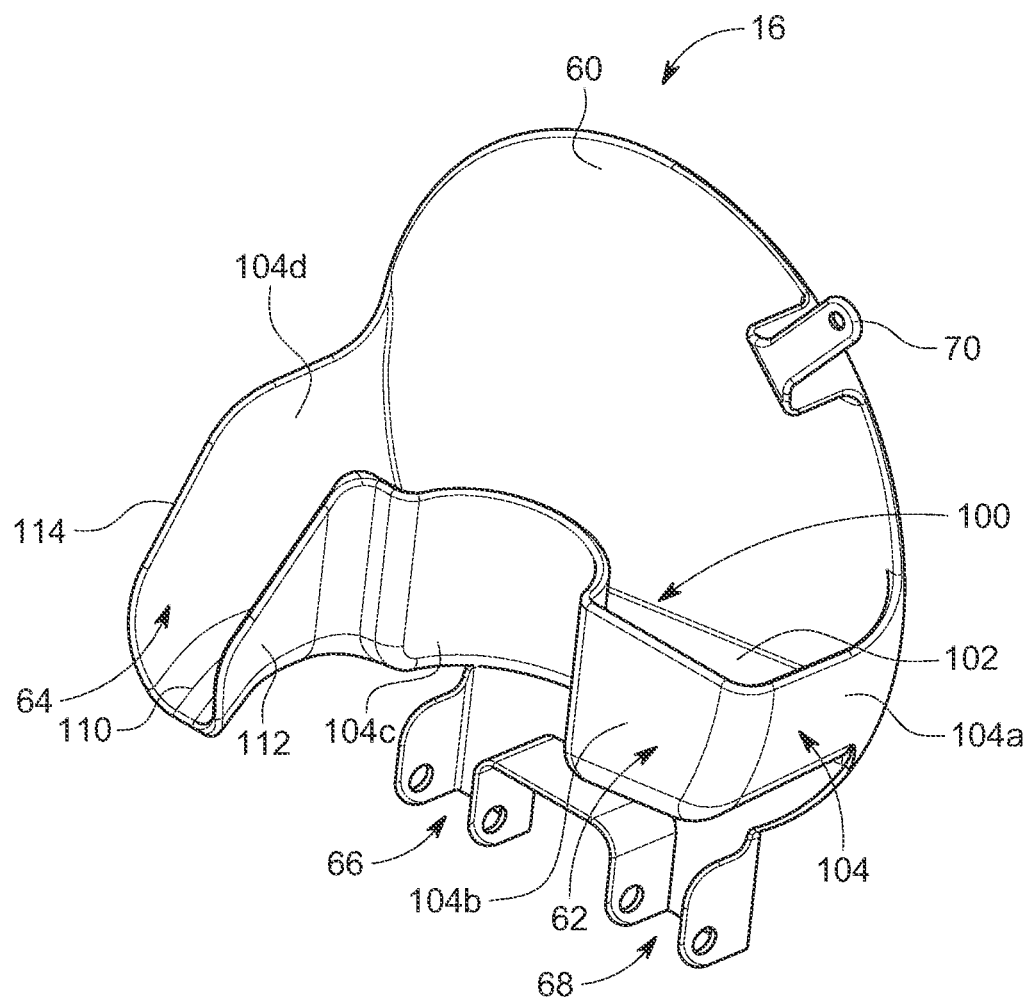
FIG. 3 is a perspective view of an example tool storage device used in the containment assembly of FIG. 1.
Figure 4:
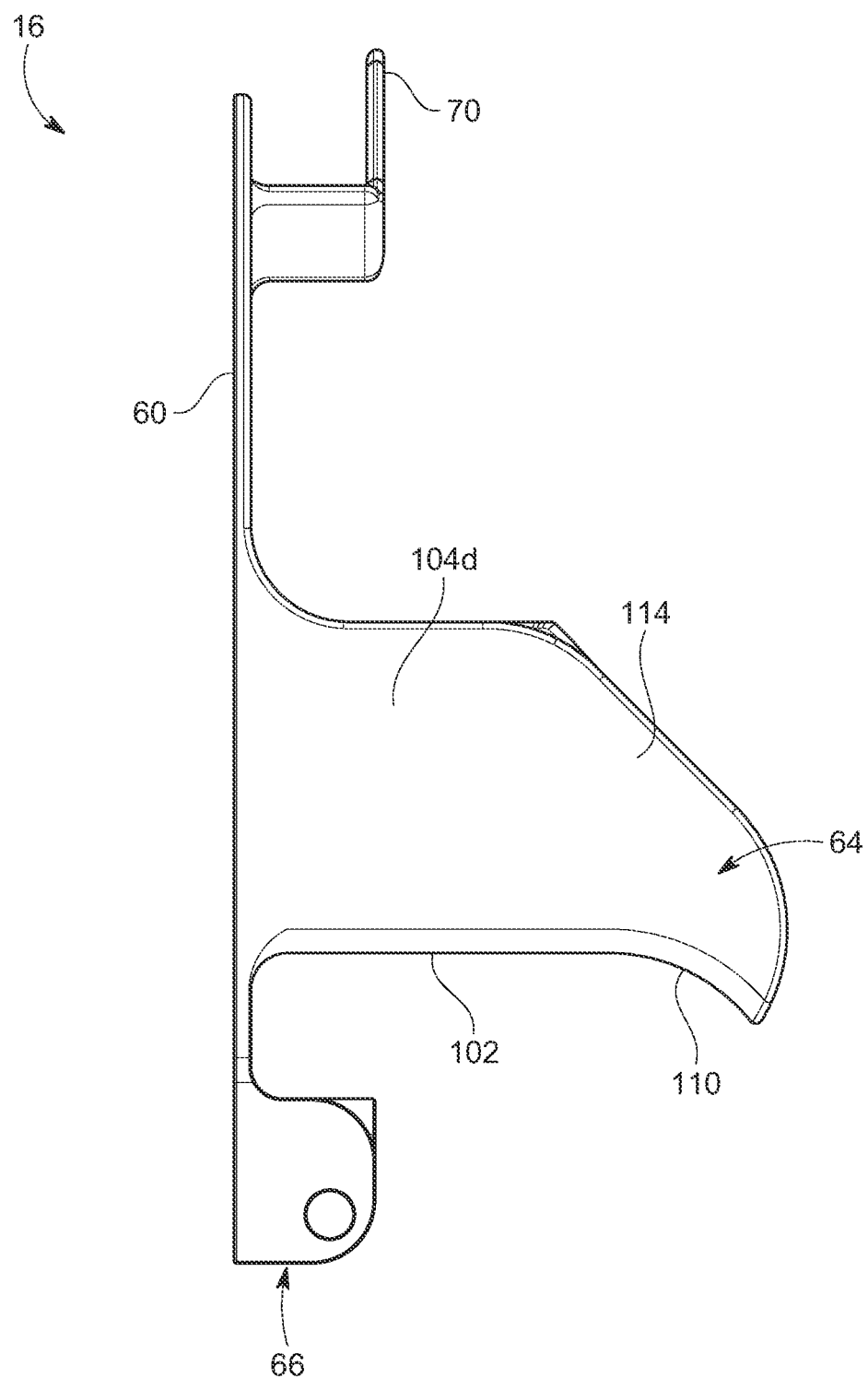
FIG. 4 is a left side view of the tool storage device of FIG. 3.
Figure 5:
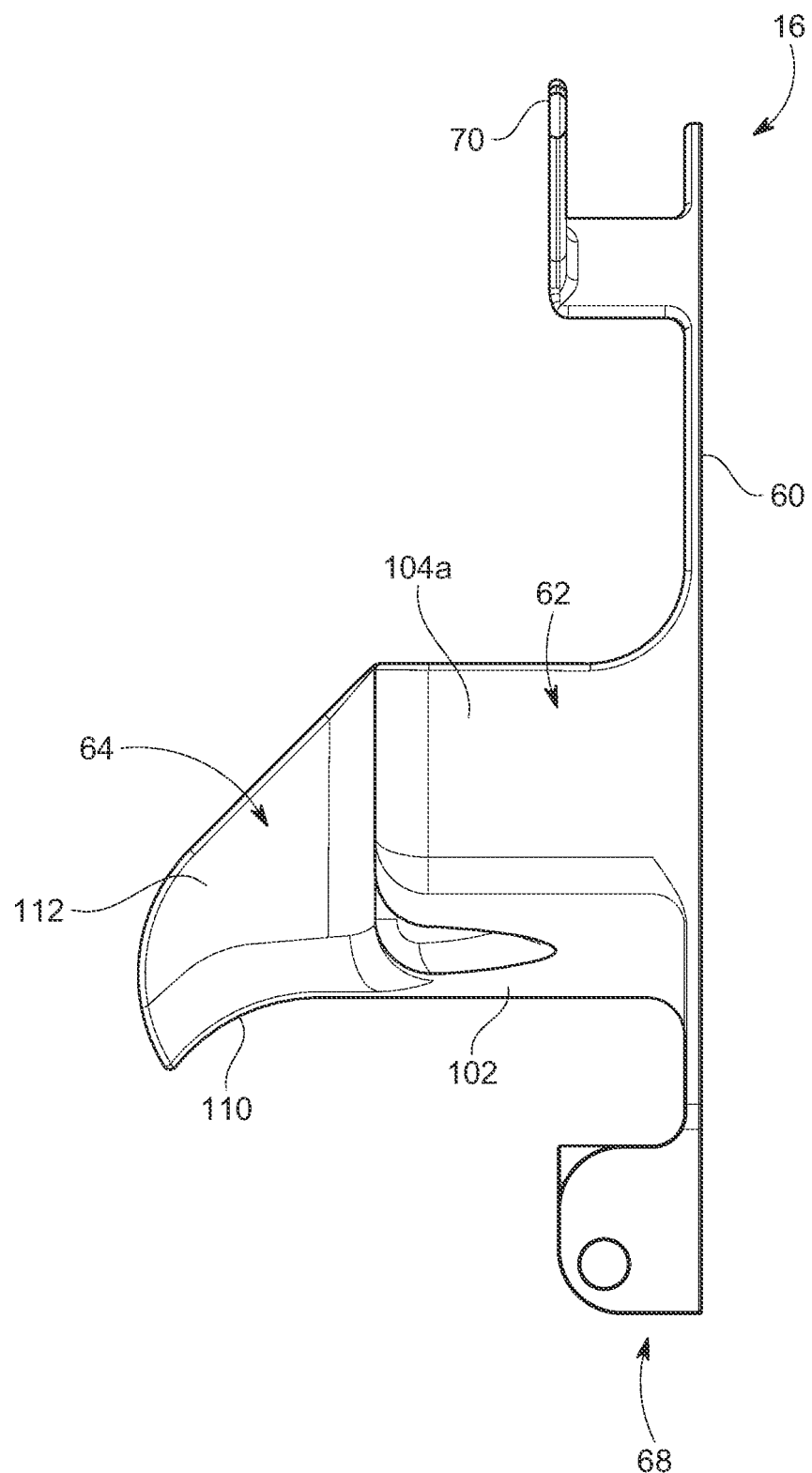
FIG. 5 is a right side view of the tool storage device of FIG. 3.
Figure 6:
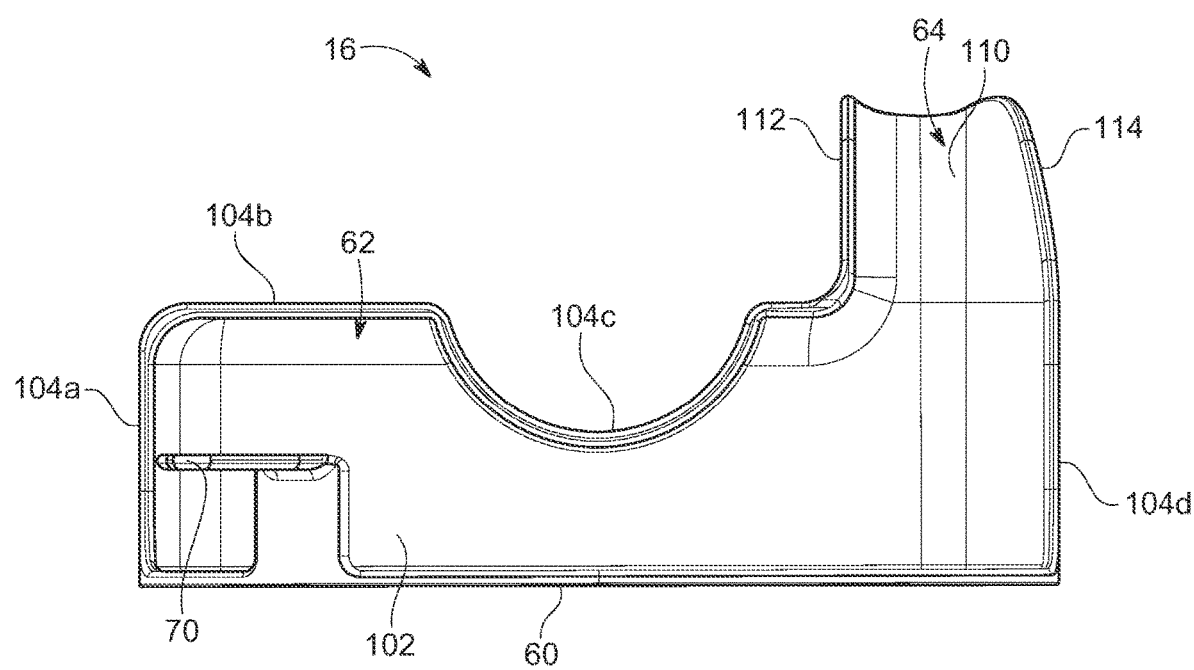
FIG. 6 is a top plan view of the tool storage device of FIG. 3.
Figure 7:
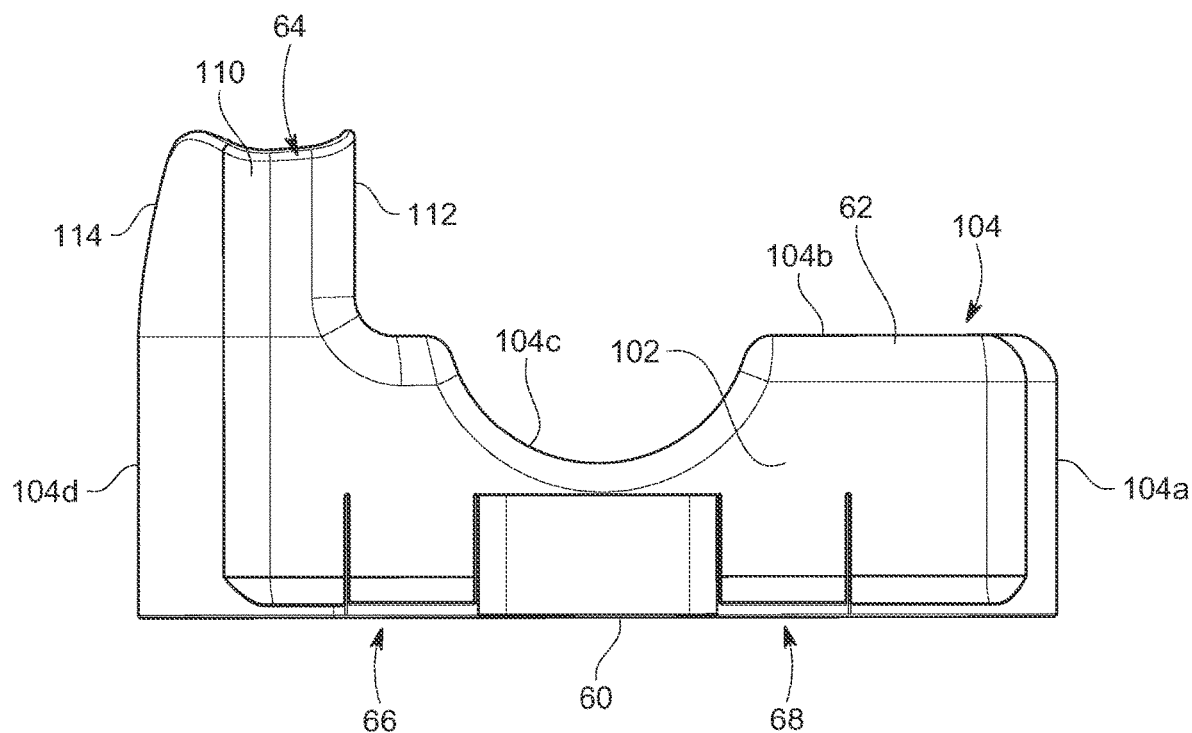
FIG. 7 is a bottom plan view of the tool storage device of FIG. 3.

During formation of the assembly 10, respective hinge support portions from the container 12, lid 14 and tool storage device 16 can be aligned with one another. Accordingly, hinge support portion 30 is aligned with hinge support portion 46 and hinge support portion 66. In a similar manner, hinge support portion 32 is aligned with hinge support portion 48 and hinge support portion 68. Pins 80 can be positioned through apertures in the hinge support portions such that lid 14 and tool storage device 16 can pivot with respect to the container 12. As a result, the assembly 10 can be positioned in an open configuration (as shown in FIG. 2, with lid 14 positioned away from container 12) and a closed configuration, whereby bill 44 is positioned over and covers line support 26.

When placed in service, assembly 10 is generally used in the transfer of fluid from a first tank (e.g., a storage tank at an oil field) to a second tank (e.g., a mobile tank positioned on a truck). The assembly 10 can be positioned in the closed configuration when not in use, whereby the lid 14 protects unwanted contaminants from entering container 12. A first line (e.g., a supply line or the like connected with a storage tank) is fluidly connected with the collar support 28 to supply fluid (e.g., oil) to the assembly 10. A transfer line (e.g., a hose or the like connected with a mobile tank) passes through the line support 26 and connects with the collar support 28, fluidly connecting the supply line and the transfer line. In other embodiments, the containment assembly 10 can be used to house fluid without the use of the collar support 28.

When filling a second tank using a transfer line, a user carries an end of the transfer line (e.g., using a T-shaped line connector having a cap, using a cap and a plug) and positions the connector and transfer line within the container 12, with a portion of the line positioned on the line support 26. The user can then remove the line connector and position the line connector and/or other tools (e.g., a plug on the line and/or connected with the support collar 28) on the tool support component 62. Any excess oil or waste spilling off the line connector or other tools collects within the tool component 62 and transfers to the fluid delivery component 64. The fluid delivery component 64 can be provided with a funnel shape that directs fluid from the tool component into the container 12. In particular, the fluid delivery component 64 is provided to prevent oil spilling from an interior of lid 14 through hinge portions 30 and 32 and onto the ground. When the user closes lid 14, any liquid within the tool component 62 and fluid delivery component 64 is directed from an interior of the lid 14 toward the interior volume of the container 12.

With further reference to FIGS. 3-9, the tool support component 62 defines a fluid collection component 100 (i.e., a sump) for fluid collection formed from a bottom wall 102 and a perimeter wall 104. The fluid collection component 100 can be used to protect hinge portions of the containment assembly 10 from exposure to fluid and further protect fluid from exiting the lid 14 through the hinge portions. The bottom wall 102 and perimeter wall 104 extend from the base component 60 to form the sump 100, which operates to collect fluid from a tool positioned therein. The bottom wall 102 is oriented such that when the containment assembly 10 is in the open configuration, gravity forces the tool and any excess fluid into the bottom wall 102. Perimeter wall 104 extends from the bottom wall 102 to assist in containing any fluid within the sump 100.

In the embodiment illustrated, perimeter wall 104 is formed of a plurality of continuous sections 104a-d, wherein sections 104a and 104d can be referred to as side wall sections and sections 104b and 104c can be referred to as front wall sections. Section 104a extends away from the base component 60 and is integrally connected with bottom wall 102 and section 104b in the illustrated embodiment. A length of section 104a can be selected to contain a tool within the sump 100. Sections 102b and 102c are integrally connected with one another and with the bottom wall 102. Section 102c, in the illustrated embodiment, is shaped (i.e., annular) to accommodate collar support 28.

Figure 8:
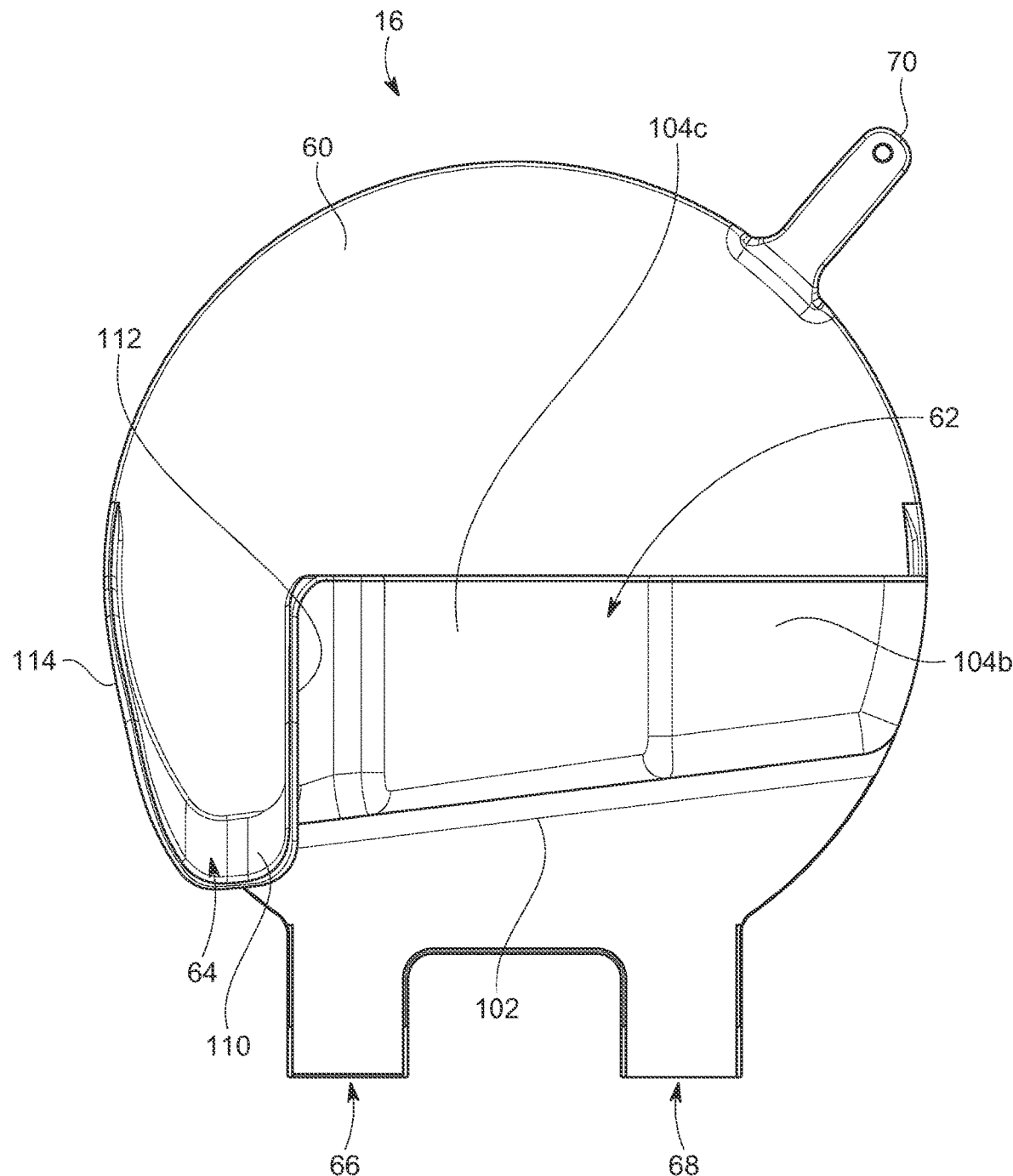
FIG. 8 is a front view of the tool storage device of FIG. 3.
Figure 9:
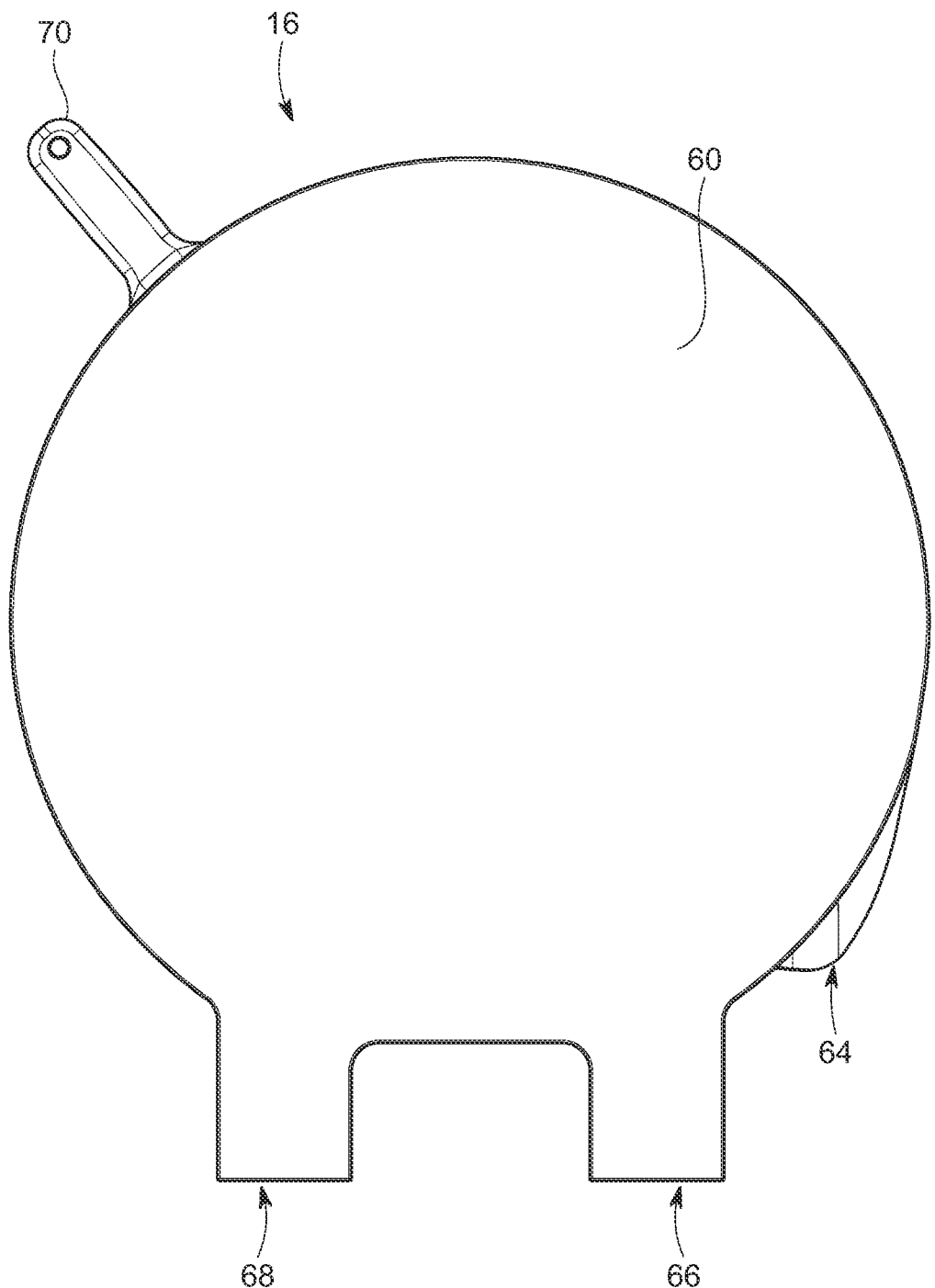
FIG. 9 is a rear view of the tool storage device of FIG. 3.
Figure 10:
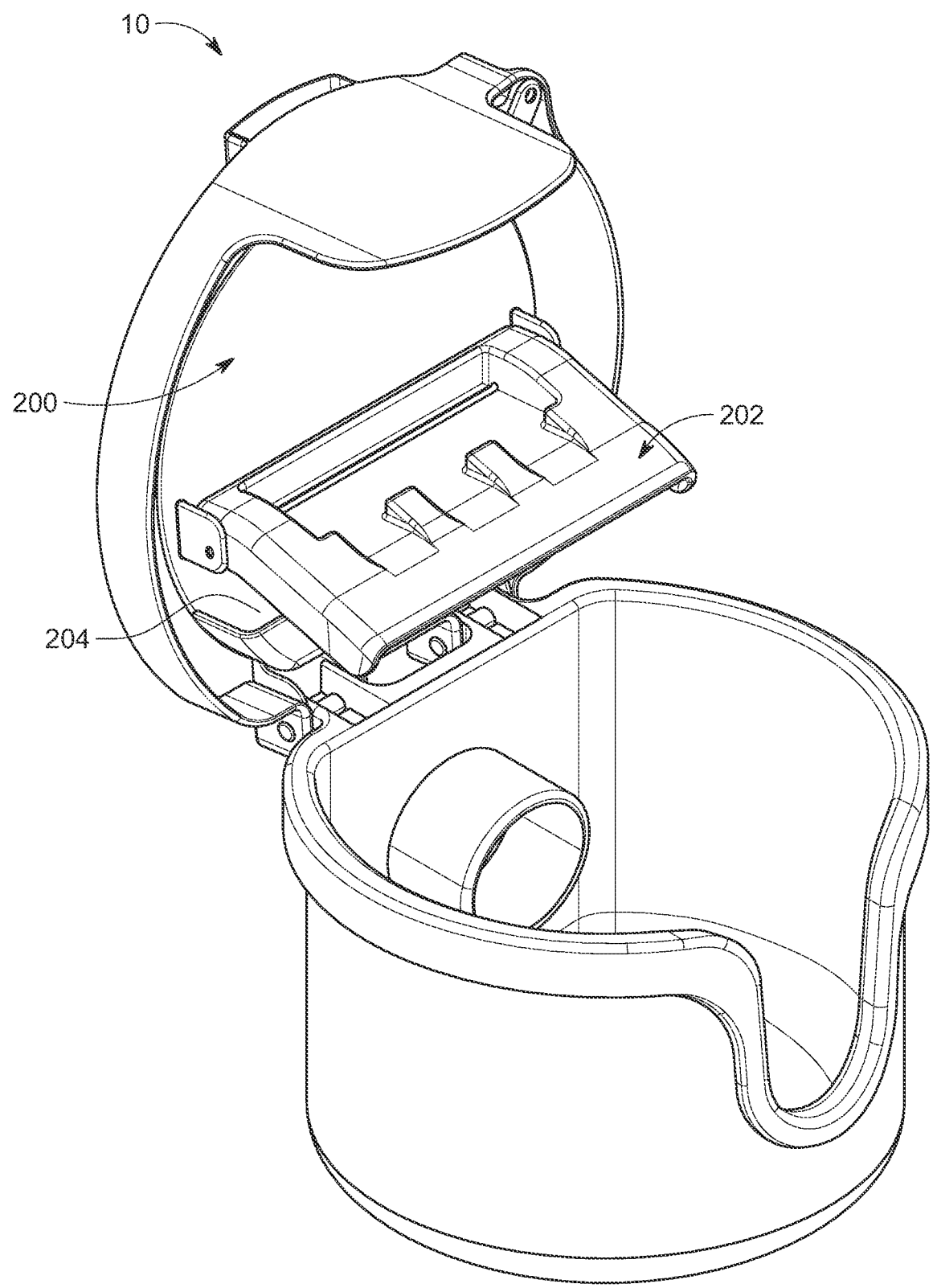
FIG. 10 is a perspective view of a load line containment assembly having an alternative tool storage device and a separate fluid collection and delivery component.
Figure 11:
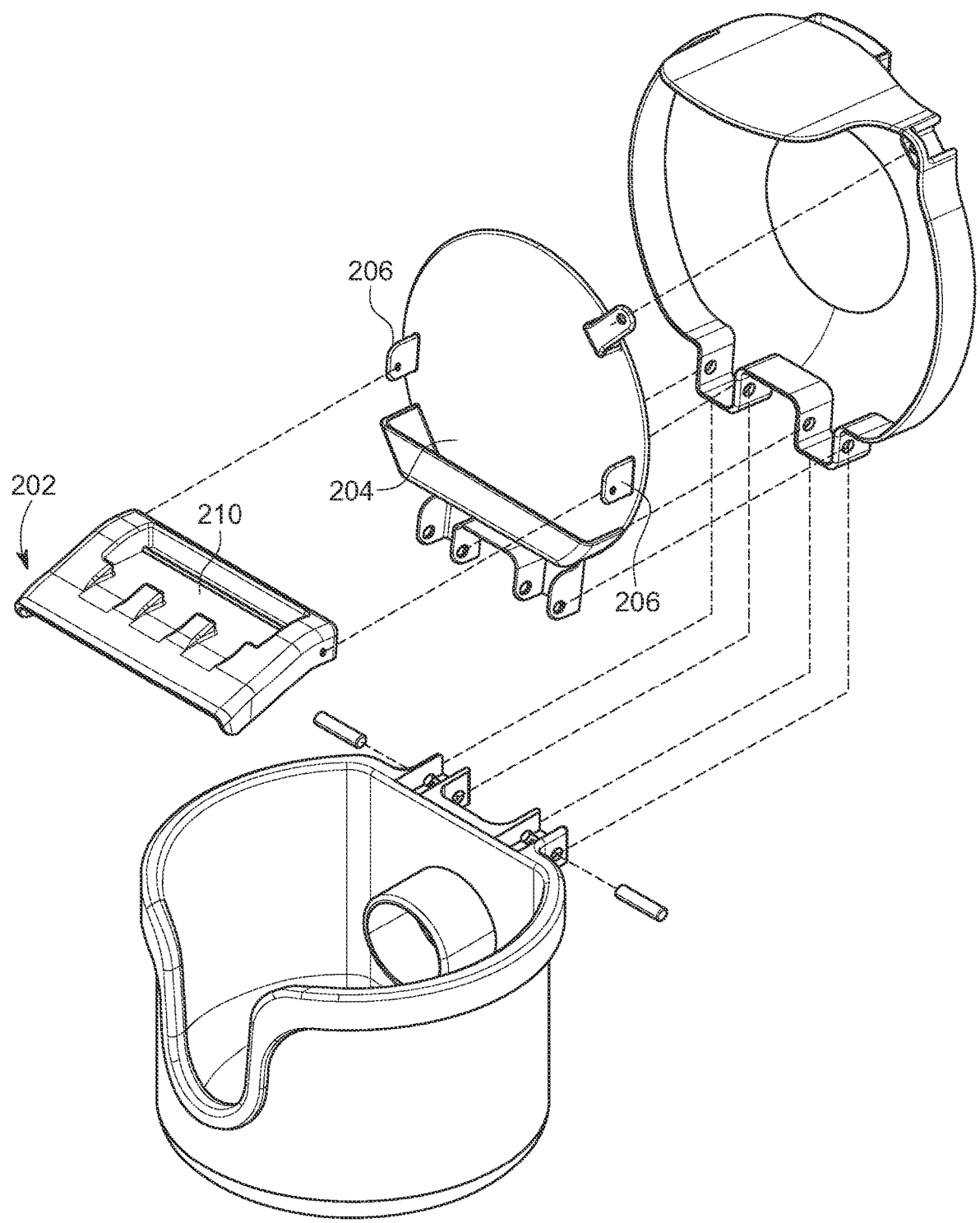
FIG. 11 is an exploded perspective view of the assembly of FIG. 10.
Figure 12:
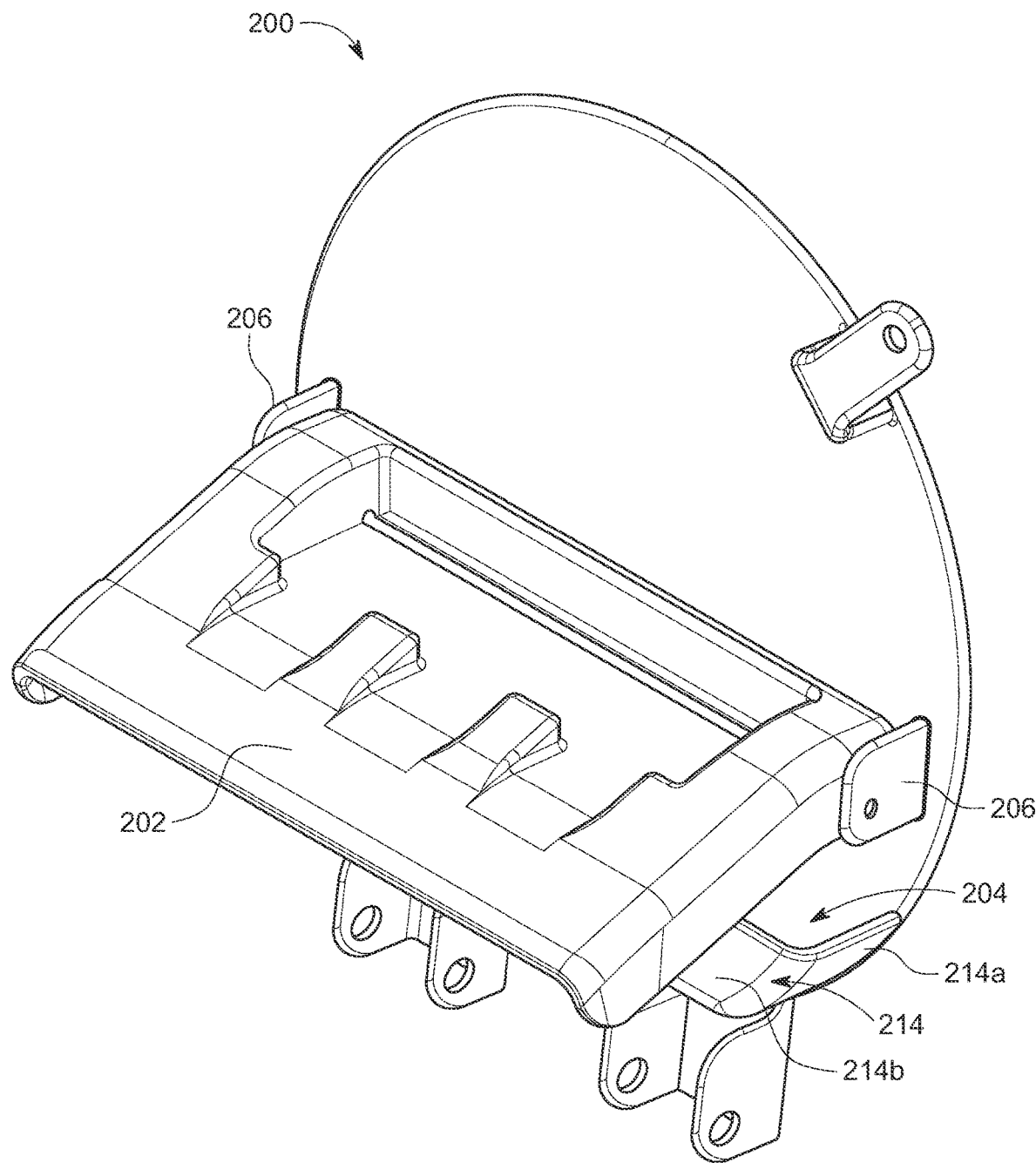
FIG. 12 is a perspective view of an example tool storage device used in the containment assembly of FIG. 10.
Figure 13:
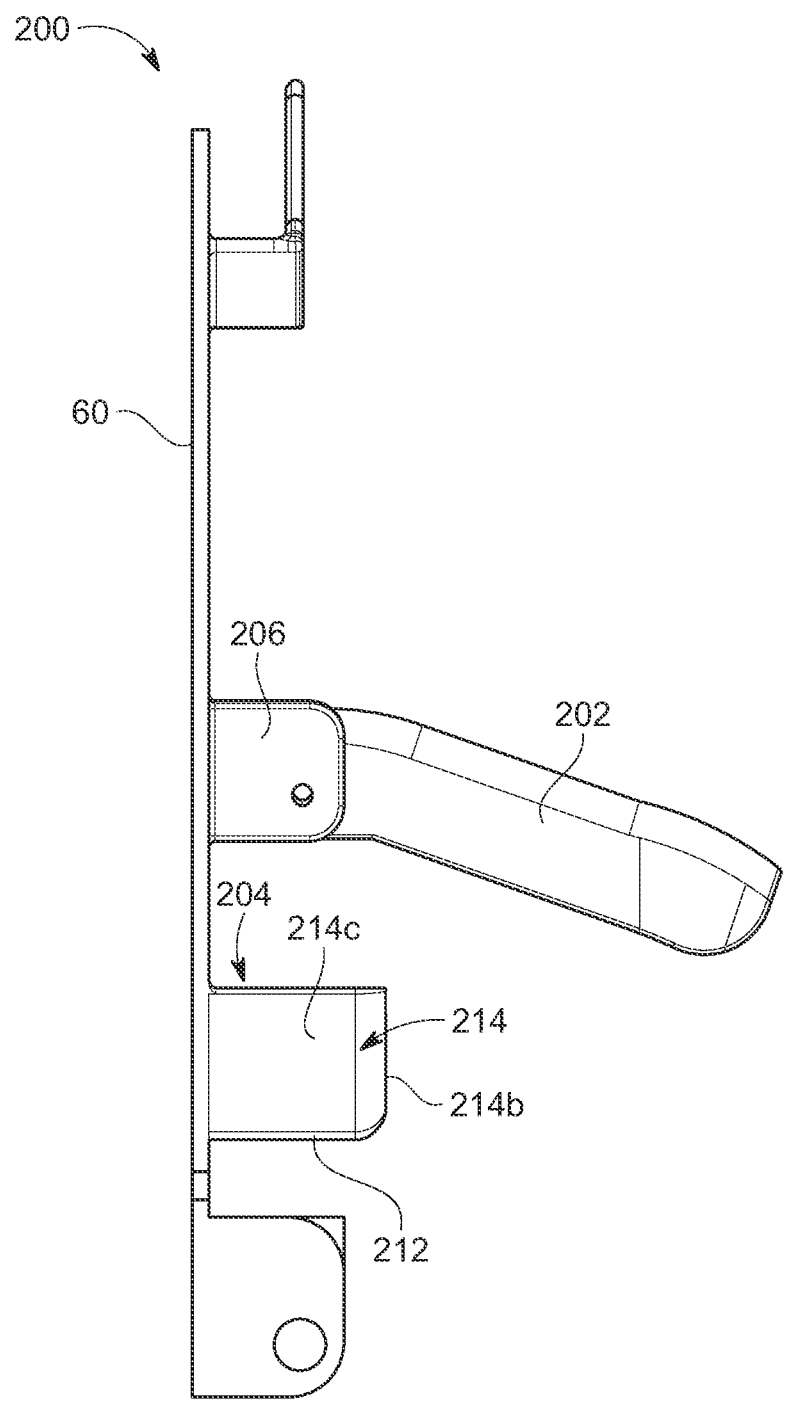
FIG. 13 is a left side view of the tool storage device of FIG. 12.
Figure 14:
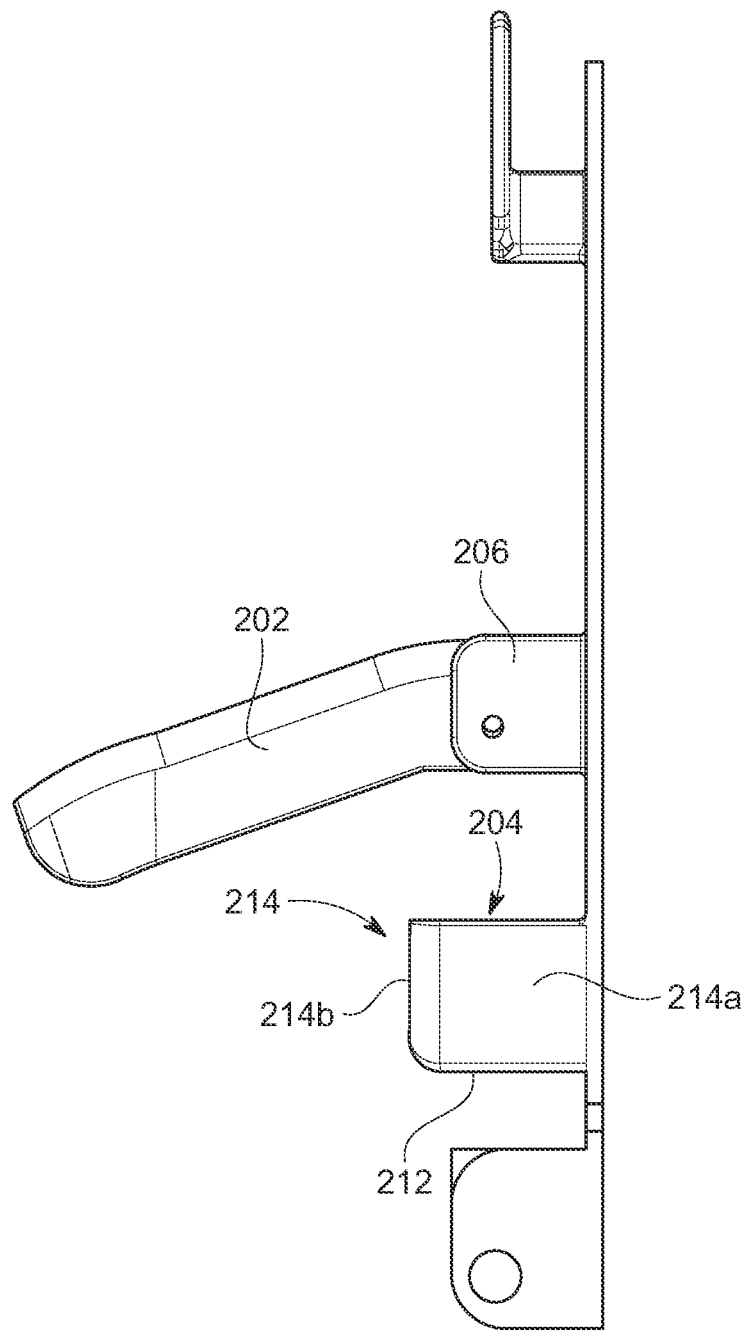
FIG. 14 is a right side view of the tool storage device of FIG. 12.
Figure 15:
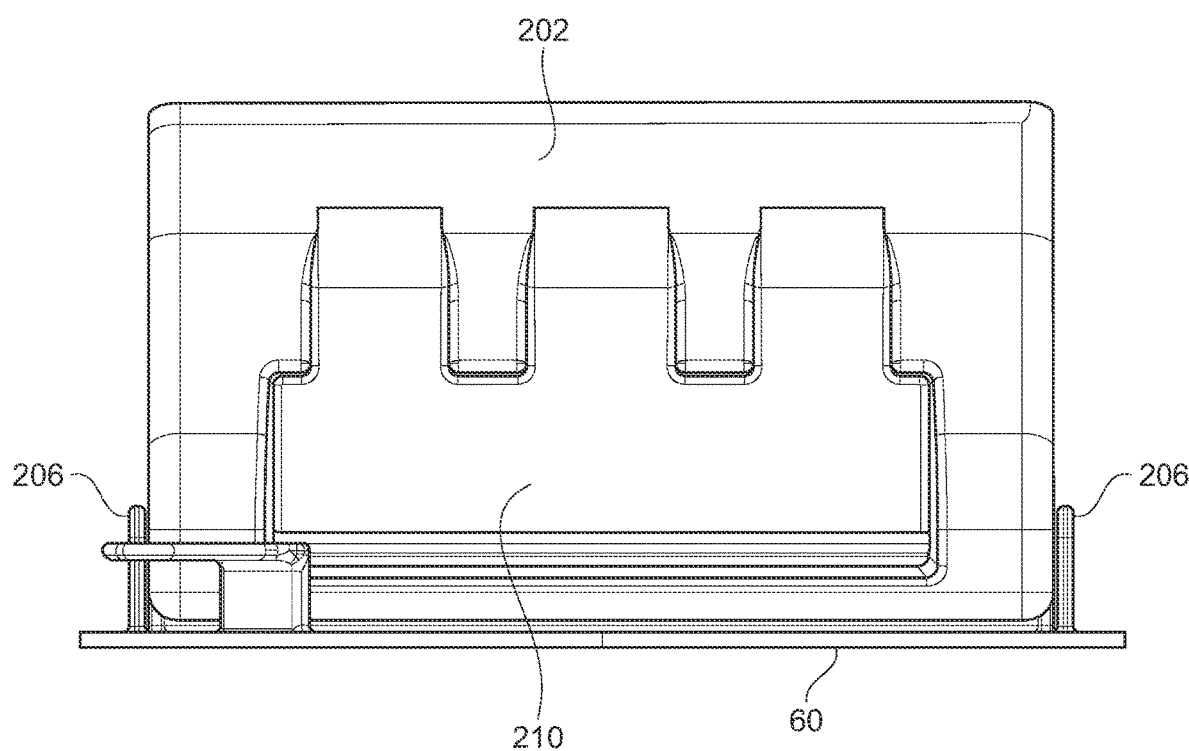
FIG. 15 is a top plan view of the tool storage device of FIG. 12.
Figure 16:
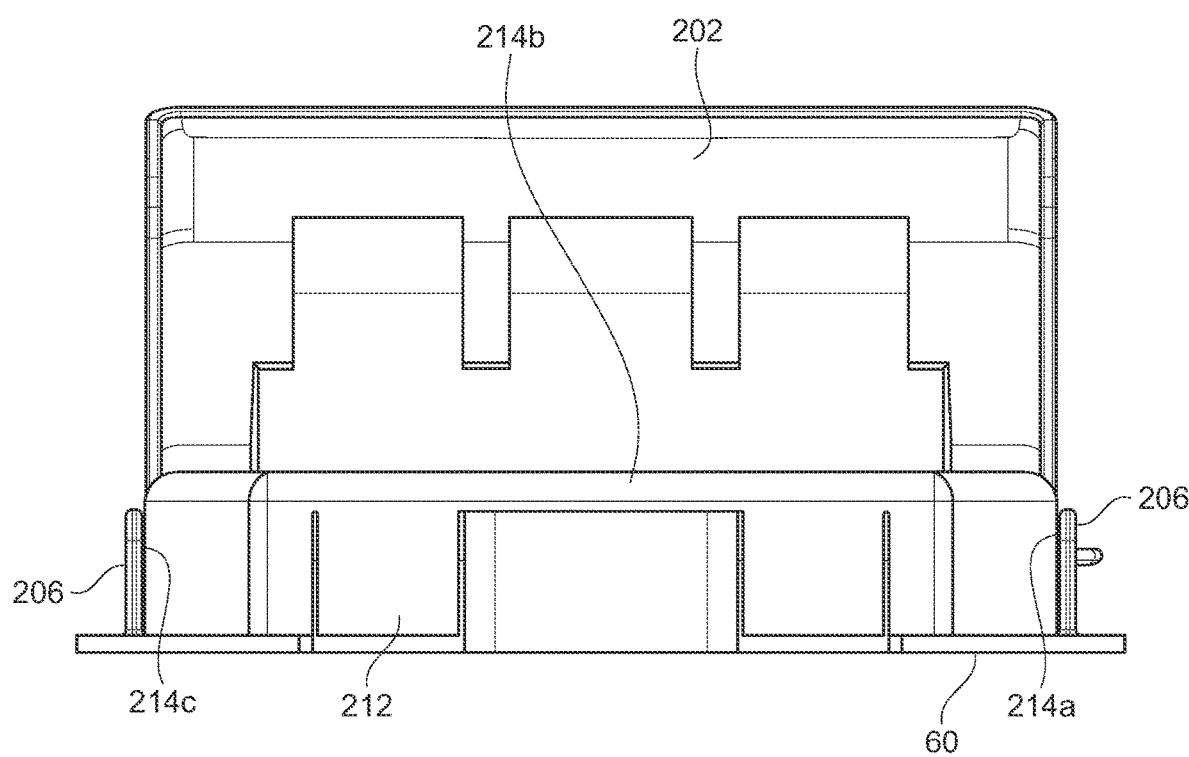
FIG. 16 is a bottom plan view of the tool storage device of FIG. 12.
Figure 17:
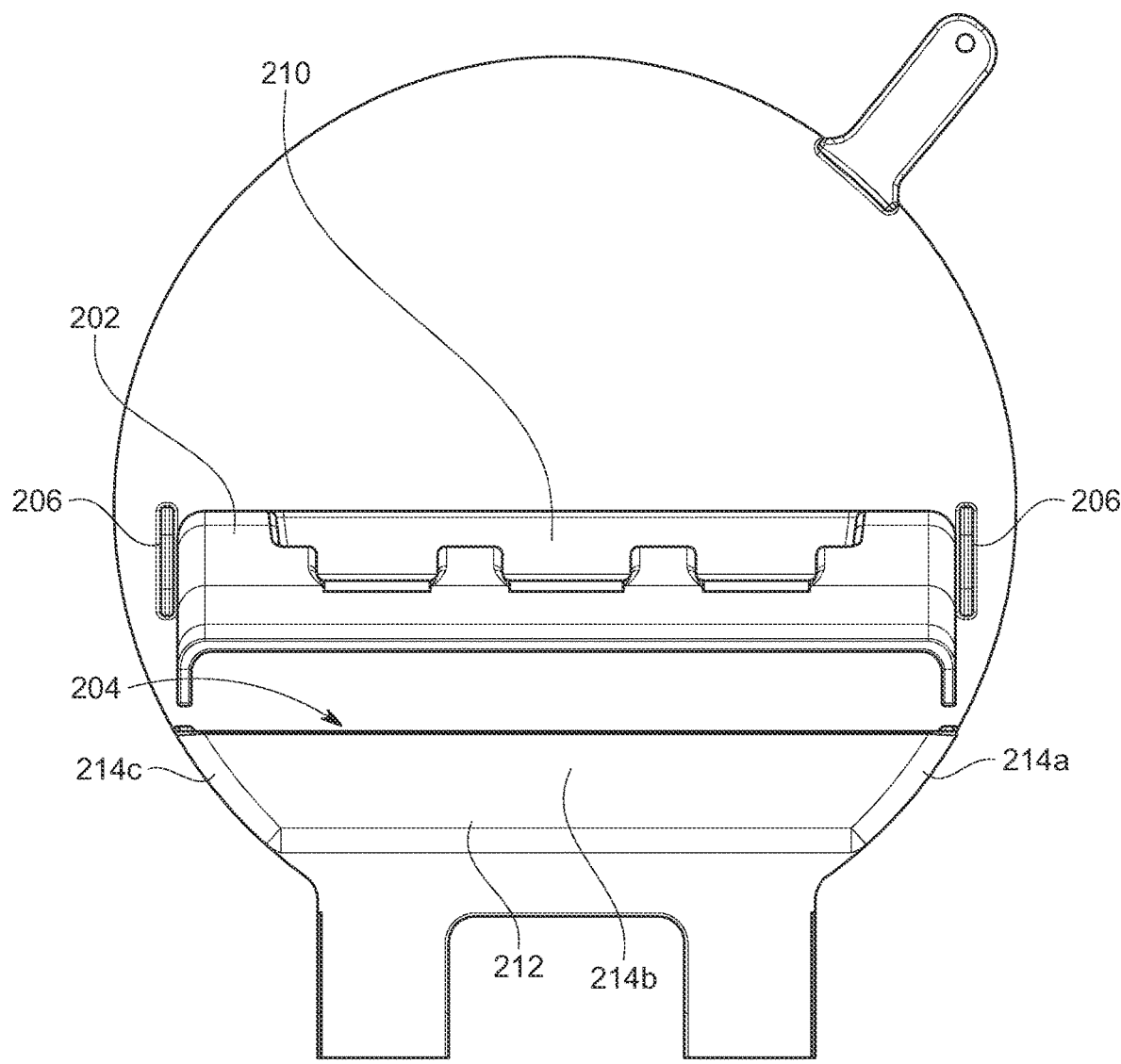
FIG. 17 is a front view of the tool storage device of FIG. 12.
Figure 18:
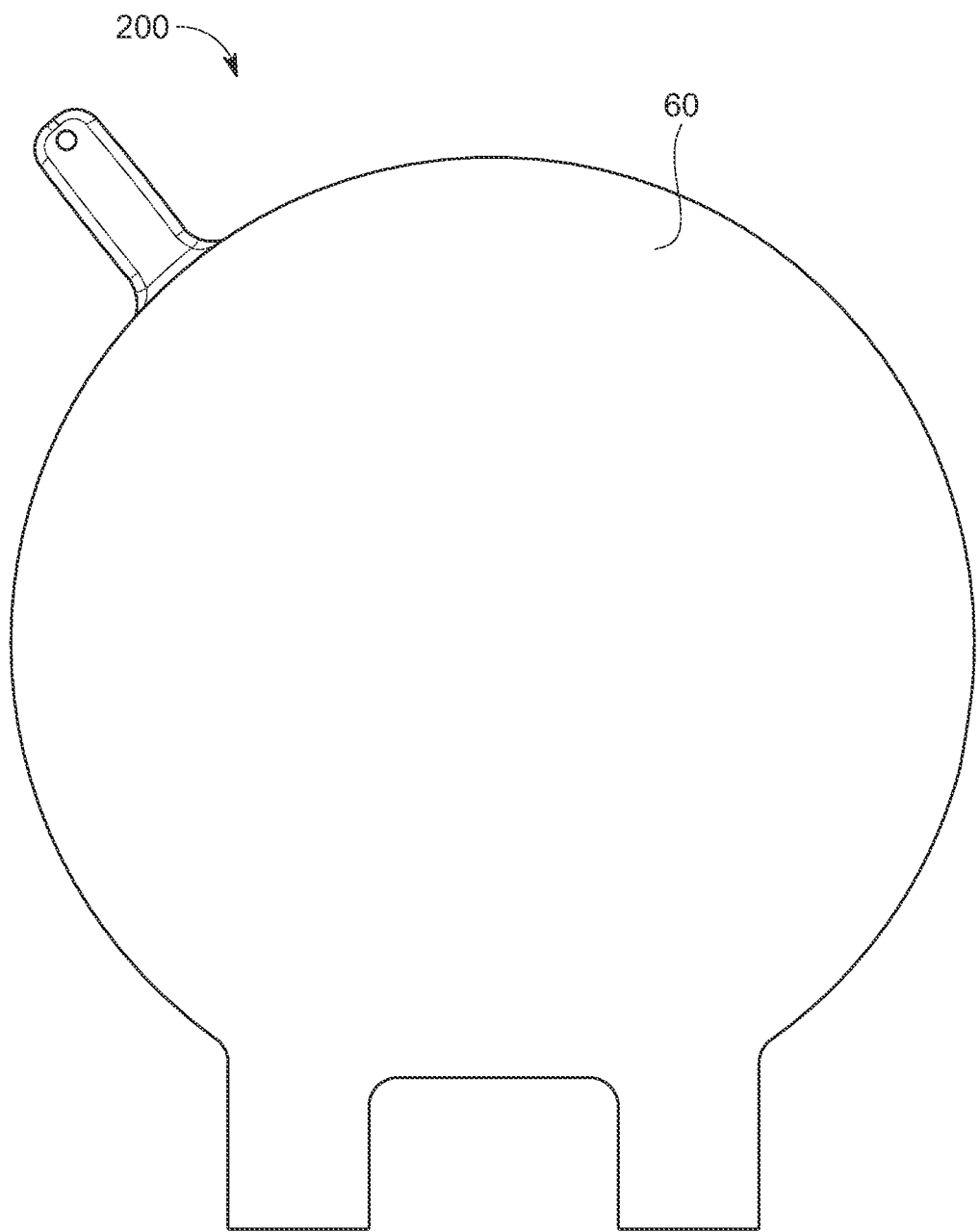
FIG. 18 is a rear view of the tool storage device of FIG. 12.

Perimeter wall 104 is further connected with fluid delivery component 64, which includes a bottom wall 110 and side walls 112 and 114. The bottom wall 110 is connected with bottom wall 102 such that fluid from bottom wall 102 flows into bottom wall 110. Side wall 112 is connected with section 104c, whereas side wall 114 is connected with section 104d. Collectively, the bottom wall 110 and side walls 112, 114 form a funnel that directs fluid from the sump 100 into the container 12. To that end, bottom wall 110 can be oriented in a direction (i.e., downward when the containment assembly 10 is in the open configuration) with respect to the sump 100. Moreover, as illustrated in FIG. 8, bottom wall 102 can further be oriented in a direction (i.e., downward when the containment assembly 12 is in the open configuration) to direct fluid into the fluid delivery component 64.

FIGS. 10-18 illustrate containment assembly 10 having an alternative tool storage device 200. Device 200 includes a tool support component 202 separate from a fluid collection and delivery component 204 (i.e., a sump) positioned to collect fluid from the tool support component 202 and direct fluid to the container 12 upon closure of lid 14. In the embodiment illustrated, tool support component 202 is pivotally connected to base component 60 through a pair of opposed flanges 206. In the open configuration, the tool support component 202 can be pivoted away from base component 60, exposing a tool receiving portion 210 configured to receive a tool positioned therein. In the closed configuration, tool support component 202 can be pivoted toward base component 60.

Sump 204 is formed of a bottom wall 212 and a perimeter wall 214 extending from the base component 60. The bottom wall 212 is integral with the base component 60 and is positioned to receive fluid from the tool support component 202 when a tool is supported thereon. The perimeter wall 214 is integral with the base component 60 and the bottom wall 212 and includes a plurality of wall sections 214a-c. Wall sections 214a and 214c are directly connected with the base component 60 and can be referred to as side sections. Wall section 214b is connected between wall sections 214a and 214c and can be referred to as a front section. When containment assembly 10 is in the closed configuration, a top opening of the sump 204 allows fluid to flow into the container 12. In alternative embodiments, sump 204 can include an outlet such as a funnel-like shape to assist in delivering fluid to the container 12 when containment assembly 10 is in the closed configuration. A size of sump 204 can be selected to capture fluid falling from tool support component 202. Additionally, other features can be applied to the tool support component 202 that assist in directing fluid from the tool support component 202 to the sump 204. For example, a rear portion of the tool support component 202 can include a ramp or other feature that directs fluid from tool support component 202 into sump 204 while the tool support component 202 transitions from an open position to a storage position. Alternatively, or in addition to, a flexible member can be provided on an underside of tool support component 202 and positioned to direct any fluid from a gap between a rear portion of the tool support component 202 and the base 60.

Figure 19:
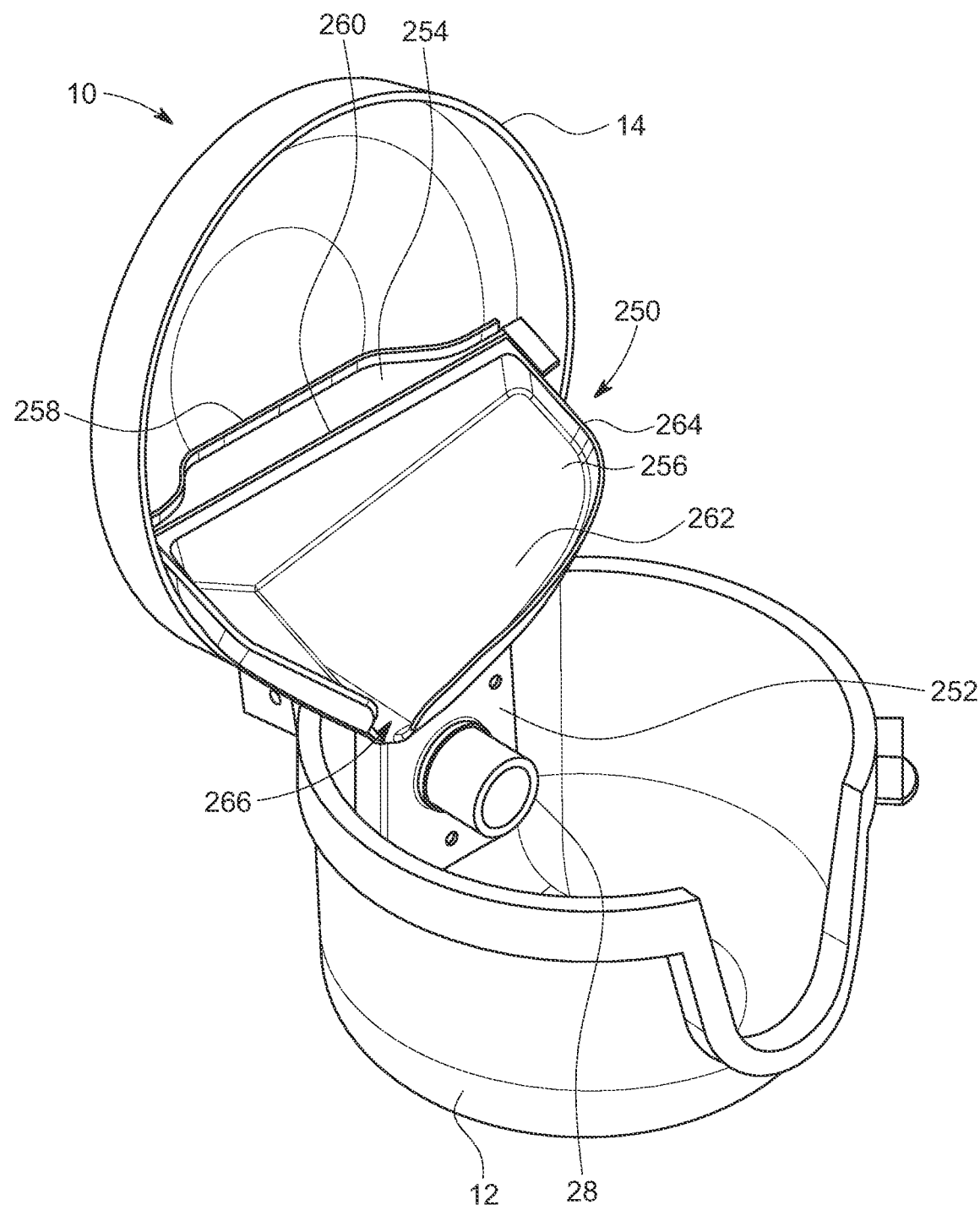
FIG. 19 is a perspective view of a load line containment assembly having an alternative tool storage device incorporating a fluid delivery component and a cover assembly.
Figure 20:
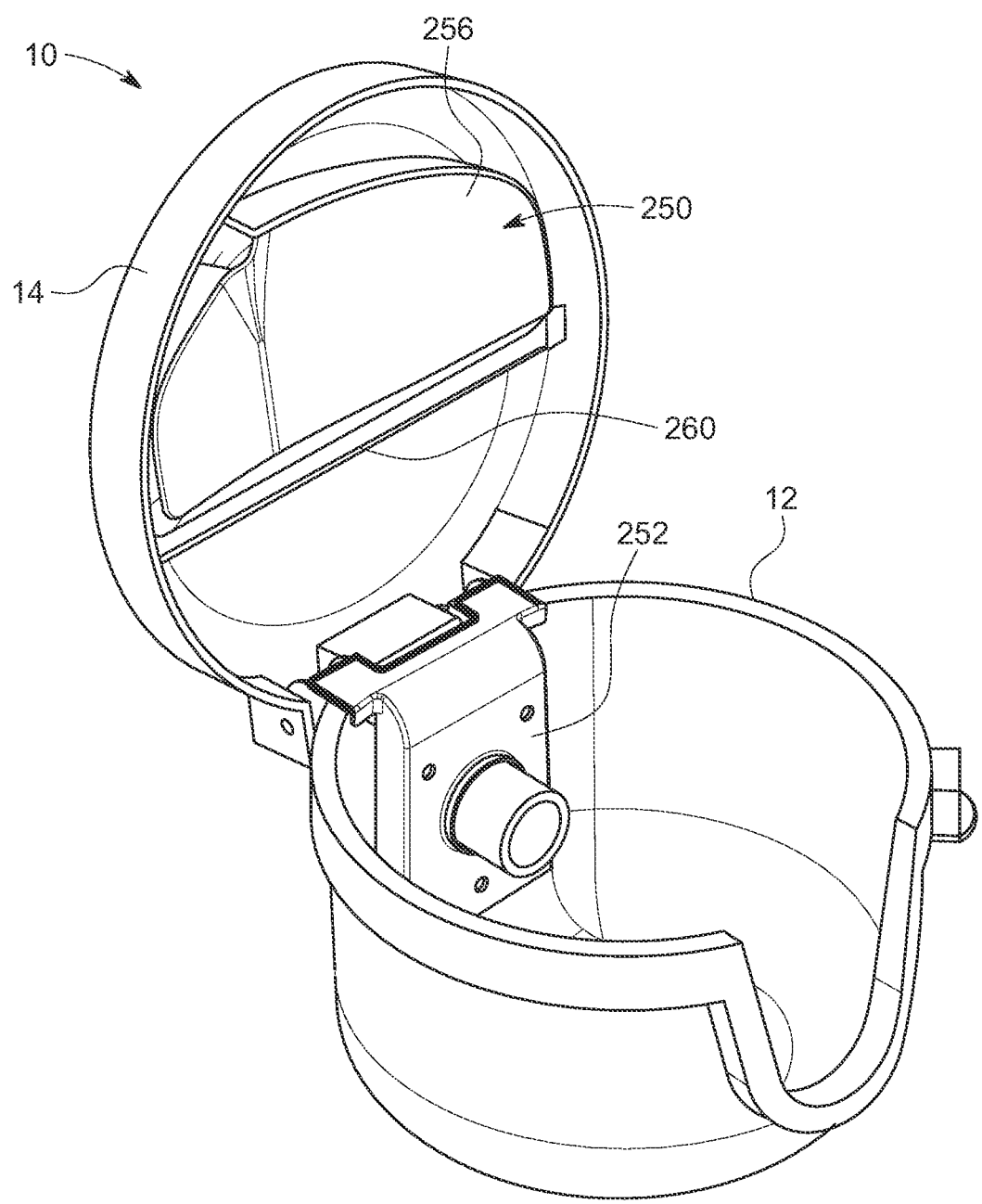
FIG. 20 is a perspective view of the load line containment assembly of FIG. 19 with the tool storage device in a storage position.
Figure 21:
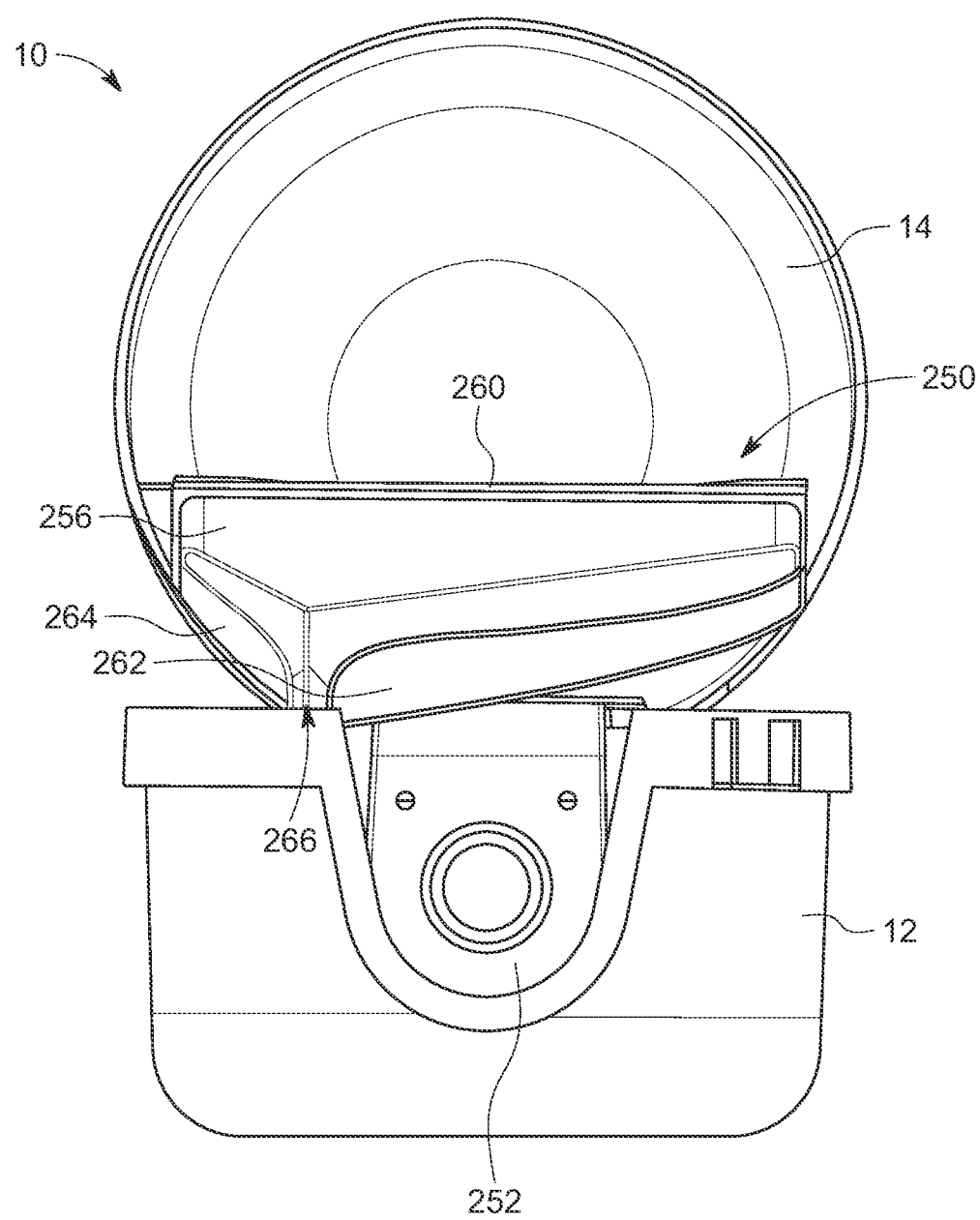
FIG. 21 is a front view of the load line containment assembly of FIG. 19.
Figure 22:
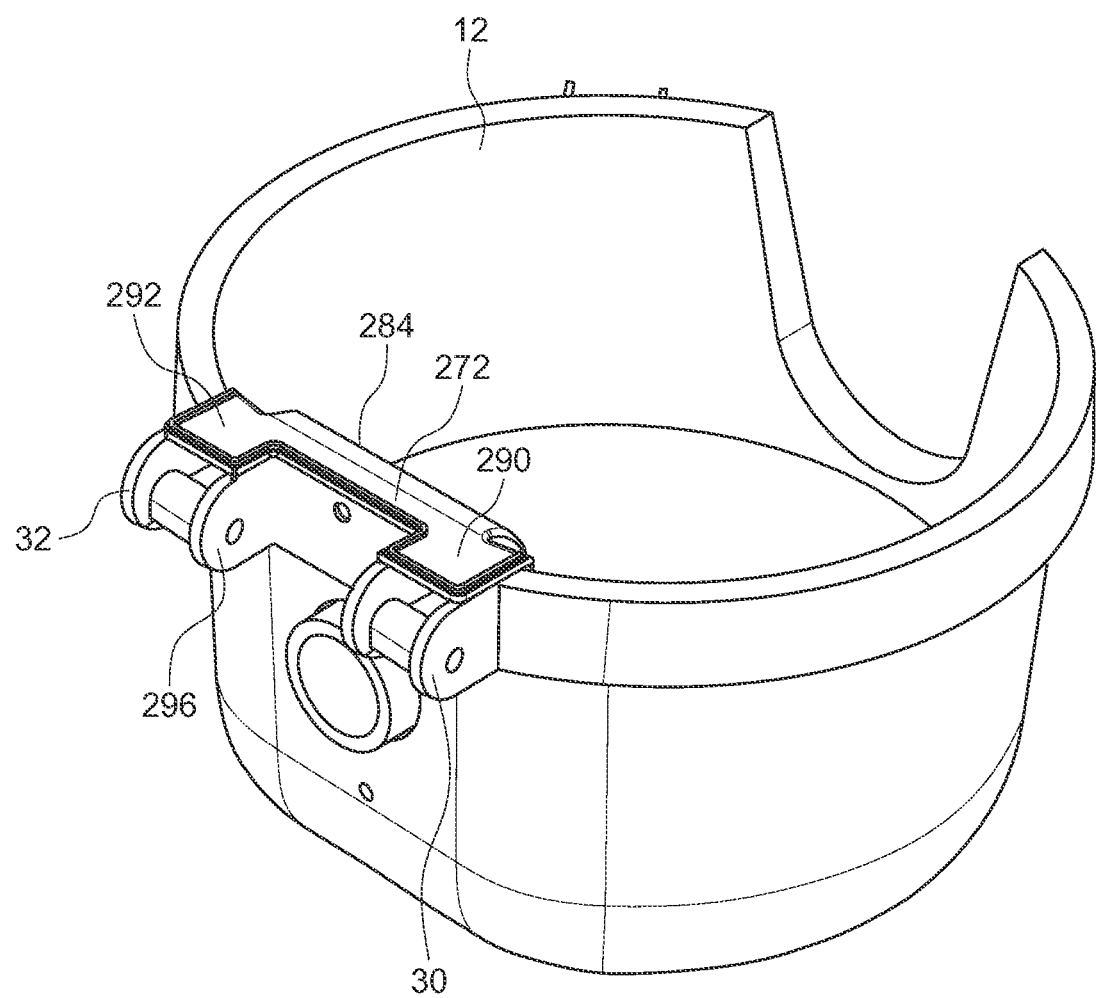
FIG. 22 is a rear perspective view of the load line containment assembly of FIG. 19 with a lid and the tool storage device removed.
Figure 23:
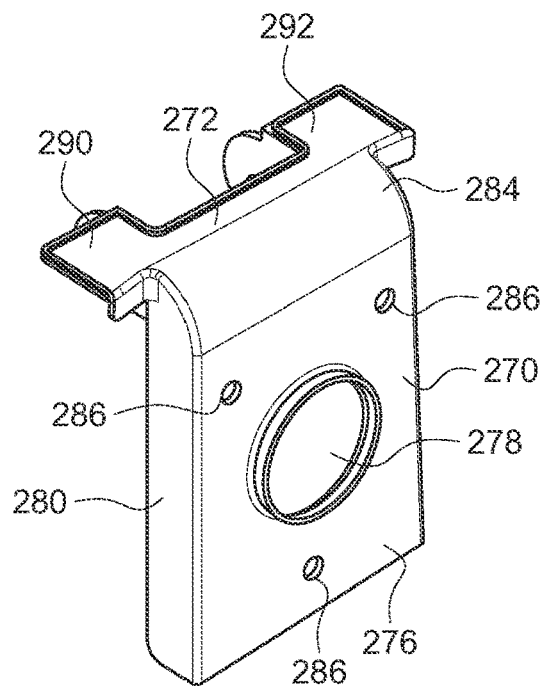
FIG. 23 is a front perspective view of the cover assembly in the load line containment assembly of FIG. 19.
Figure 24:
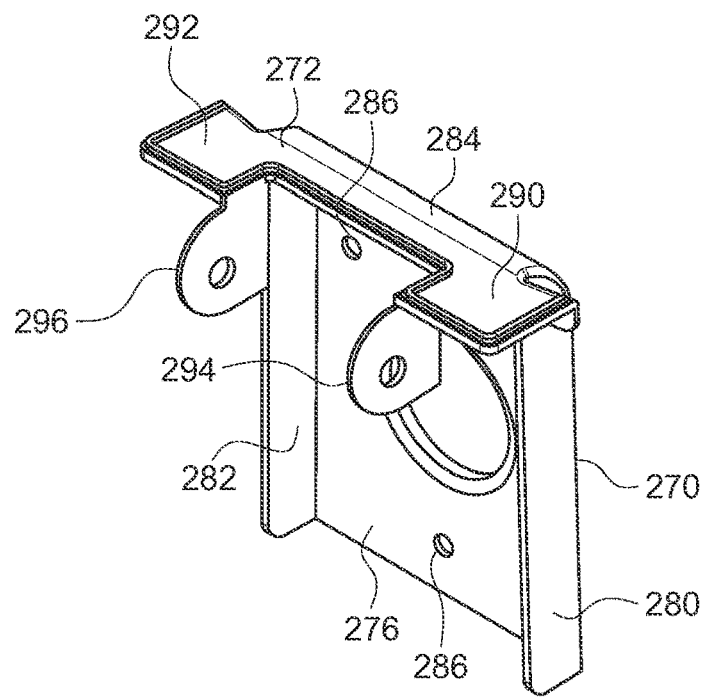
FIG. 24 is a rear perspective view of the cover assembly in the load line containment assembly of FIG. 19.

FIGS. 19-22 illustrate containment assembly 10 with an alternative tool storage device 250 and a cover assembly 252. Device 250 is operable between a first, open position (as illustrated in FIG. 19) and a second, closed position (as illustrated in FIG. 20). Device 250 includes a first portion 254 coupled with lid 14 and a second portion 256 pivotally coupled with the first portion 254.

First portion 254 is shaped to be secured to lid 14 using a lip 258 and follows along an inner profile of the lid 14 such that liquid is prevented from passing between first portion 254 and lid 14. As such, any liquid contacting first portion 254 is either maintained within first portion 254 or directed to second portion 256. In the embodiment illustrated, first portion 254 and second portion 256 are connected through a living hinge 260, although other approaches to connect first portion 254 and second portion 256 can be used (e.g., a piano hinge). A user can operate to move the storage device 250 to the closed position of FIG. 20 by lifting the second portion 256 toward the lid 14. Second portion 256 defines a fluid delivery component that includes a lower floor portion 262 surrounded by an annular wall 264. The floor portion 262 and annular wall 264 together form a funnel-like feature that directs fluid toward on outlet 266, which directs liquid into the container 12.

In an alternative embodiment, a sump such as sump 204 (see FIG. 10) can further be used to assist in collecting fluid from device 250, for example in embodiments where a piano hinge connects first portion 254 and second portion 256 or where first portion 254 is eliminated and second portion 256 is pivotally connected to lid 16.

With further reference to FIGS. 22-26, cover assembly 252 includes a first portion 270 that extends over collar support 28 and a second portion 272 that extends over an upper rim of the container 12. First portion 270 is formed of a central rectangular plate 276 defining a central aperture 278 sized to fit around the collar support 28. Side extensions 280 and 282 extend from the central plate 276 and operate to space the plate 276 from an internal portion of the container 12. An annular connecting piece 284 connects first portion 270 with the second portion 272. A plurality of apertures 286 can further be positioned in plate 276 to secure the cover assembly 252 to the container 12.

Second portion 272 includes opposed tabs 290 and 292 that extend over hinge portions 30 and 32, respectively, of container 12. Tabs 290 and 292 are shaped to cover hinge portions 30 and 32 to prevent liquid that may spill from lid 14 into the hinge portions 30 and 32 from exiting the container 12. Second portion 272 also includes hinge connection portions 294 and 296 that extend downwardly and allow connection of the cover assembly 252 to the hinge portions 30 and 32 (e.g., using pins 80 shown in FIG. 1). In one embodiment, cover assembly 252 is formed of a rigid or semi-rigid plastic material. In an alternative embodiment, illustrated in FIG. 27, a cover assembly 252' is formed of a flexible material such as polychloroprene. In such an embodiment, cover assembly 252' can include a slit 298 that allows the cover assembly 252' to be positioned over the collar support 28.

Figure 28:
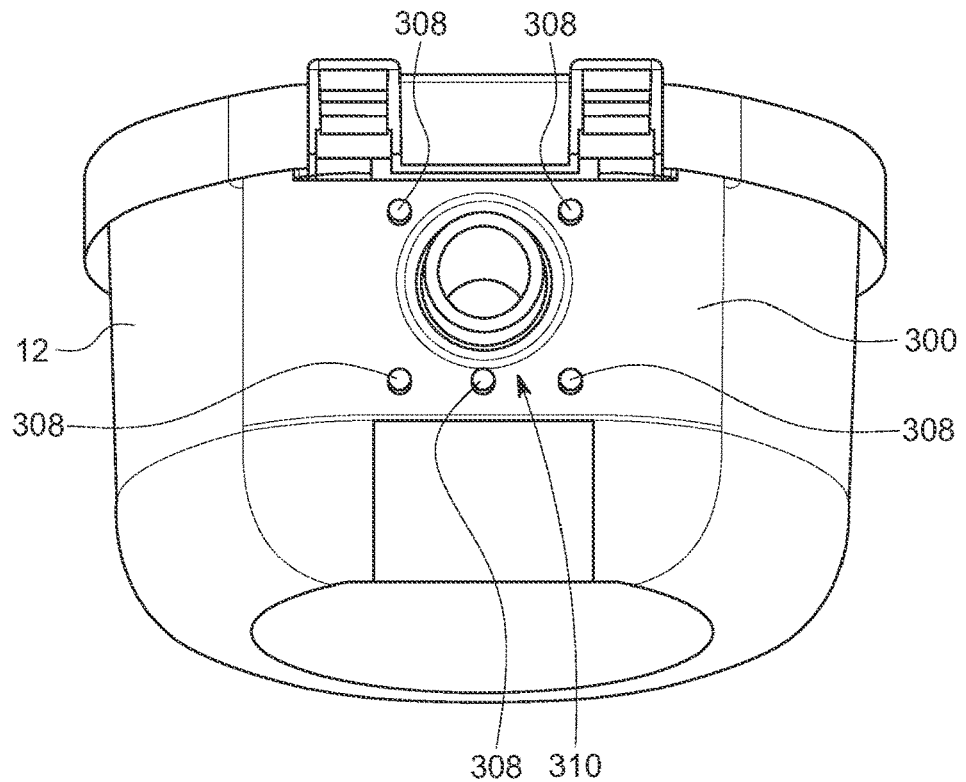
FIG. 28 is a rear perspective view of a load line containment assembly having a rear reinforcement structure.
Figure 29:
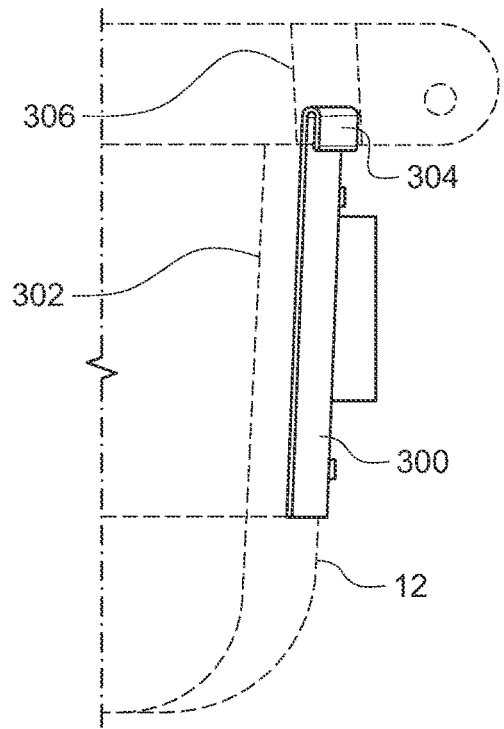
FIG. 29 is a side view of the reinforcement structure of FIG. 28 connected with the load line containment assembly in phantom lines.

In yet a further embodiment, illustrated in FIGS. 28 and 29, containment assembly 10 can include a reinforcement structure or plate 300 secured to a rear wall 302 of the container 12. Plate 300 can be formed of metal or hard plastic to prevent the rear wall 302 from sagging or collapsing due to weight of a line connected to the containment assembly 10. The plate 300 can include an upper lip 304 that is sized to extend to within an outer rim 306 of the container 12. A plurality of fasteners 308 (e.g., bolts) can be used to secure plate 300 to the rear wall 302. In one embodiment, the plate 300 can include a plurality of pre-cut apertures 310 that are sized to fit different sizes of lines within the container 12.

Figure 30:
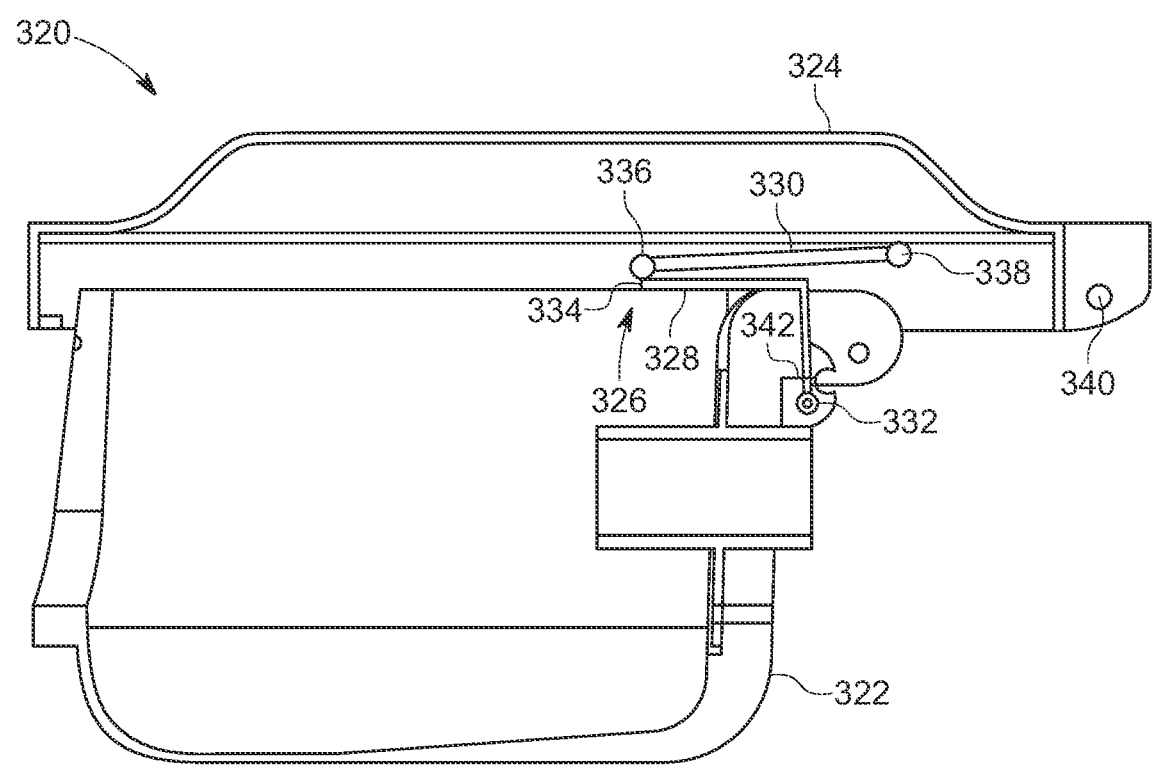
FIG. 30 is a side sectional view of a load line containment assembly having an alternative fluid delivery component in a closed position.
Figure 31:
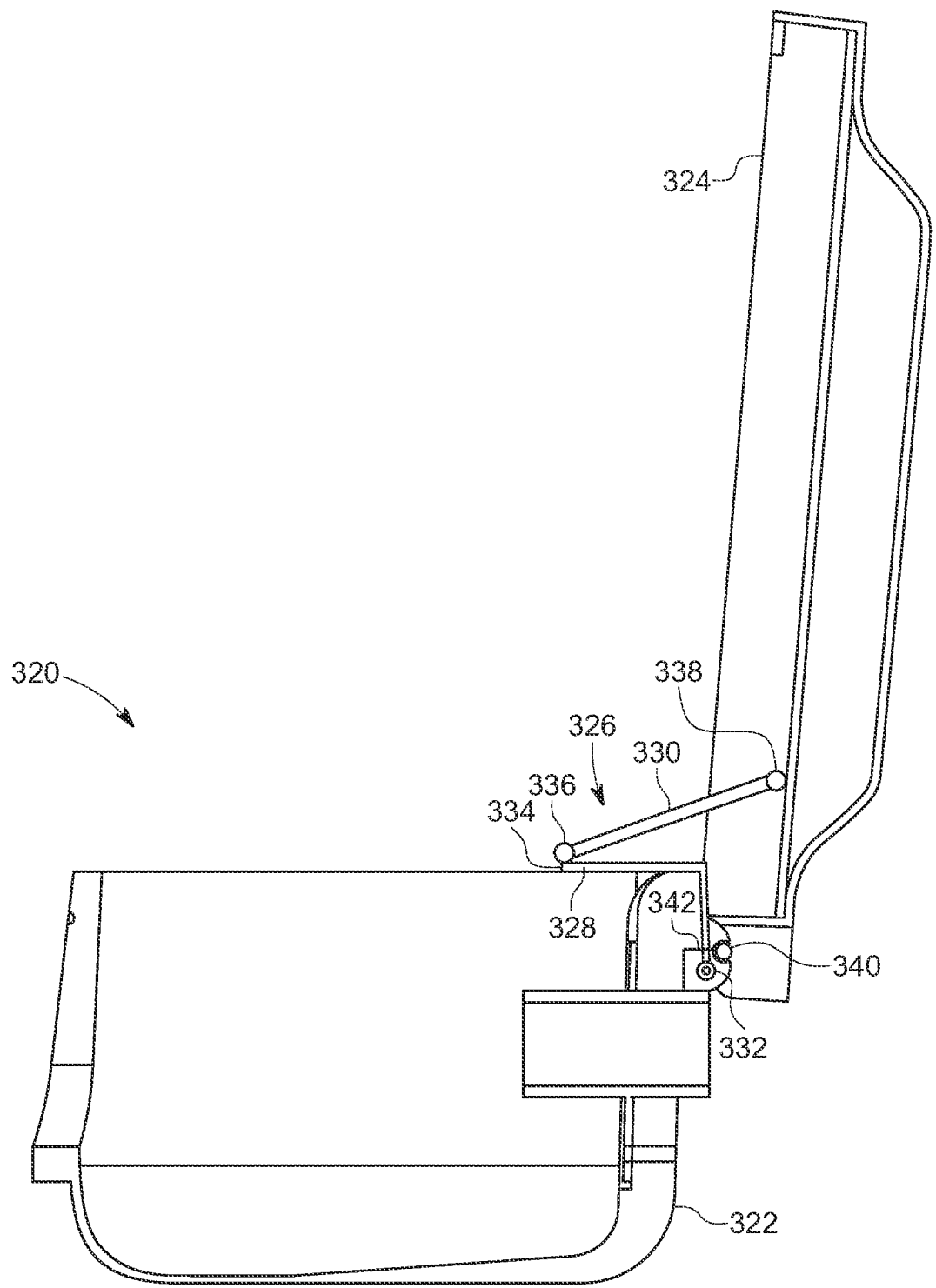
FIG. 31 is a side sectional view of the load line containment assembly of FIG. 30 in an open position.

In yet a further embodiment, illustrated in FIGS. 30 and 31, a modified containment assembly 320, which includes a container 322 and a lid 324. A fluid delivery component 326 is connected between the container 322 and the lid 324. Fluid delivery component 326 includes a support bracket 328 and a cover 330. Support bracket 328 is L-shaped, connected to the container 322 at a first position 332 and extends vertically and horizontally around the container 322 to terminate at a second position 334 inside the container 322. Cover 330 is connected to bracket 328 at a first position 336 and extends to connect to lid 324 at a second position 338, forming a tool support component configured to support a tool positioned thereon. Connection between the bracket 328 and cover 330 can be established through a living hinge or other approach to fastening position 334 to position 336. Connection between the cover 330 can be made through different approaches such as an ultrasonic weld or living hinge. During operation, the lid 324 can transition between a closed position as illustrated in FIG. 30 to an open position as illustrated in FIG. 31. In the embodiment illustrated, lid 324 includes a pin 340 that cooperates with a corresponding recess 342 on container 322 when lid 324 is in the open position. Further, in the open position, cover 330 is positioned to direct fluid that hits lid 324 and cover 330 into the container 322.

In further embodiments, containment assembly 10 can include a mechanism configured to maintain the assembly 10 in the open configuration. For example, a cord (e.g., a bungee cord) can be attached to the lid 14 (e.g., at the bill, at connecting portion 50) and further attached to the transfer line. Alternatively, or in addition to, a structural component such as a kickstand, pin, wedge, or the like can be positioned between the container 12 and the lid 14 when the assembly 10 is in the open configuration to prevent the lid 14 from pivoting relative to the container 12.

Figure 32:
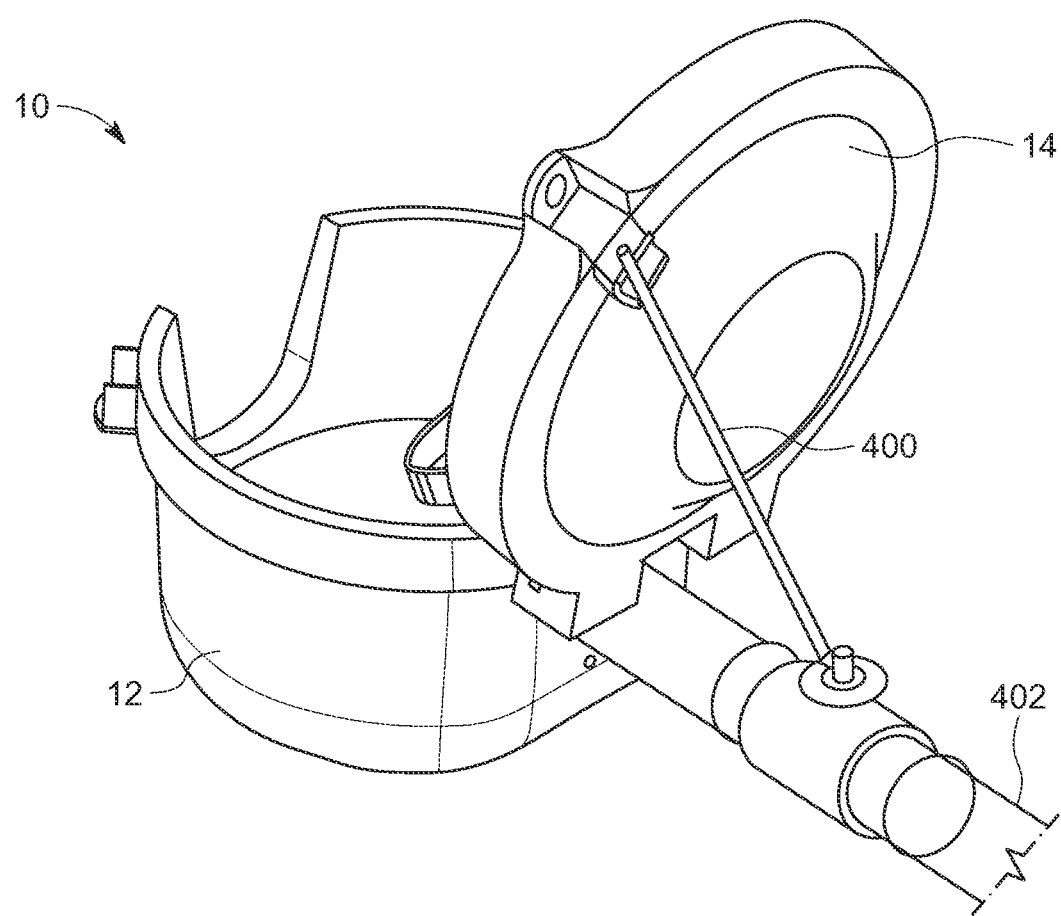
FIG. 32 is a rear perspective view of a load line containment assembly including a lid support structure.

FIGS. 32-36 illustrate various approaches to maintaining lid 14 in the open position. In FIG. 32, a rod 400 is connected between a top of the lid 14 and a supply line 402. After opening lid 14, the rod 400 is positioned to support the lid 14 in an open position by extending the lid 14 to the open position and securing rod 400 between the lid 14 and the supply line 402.

Figure 33:
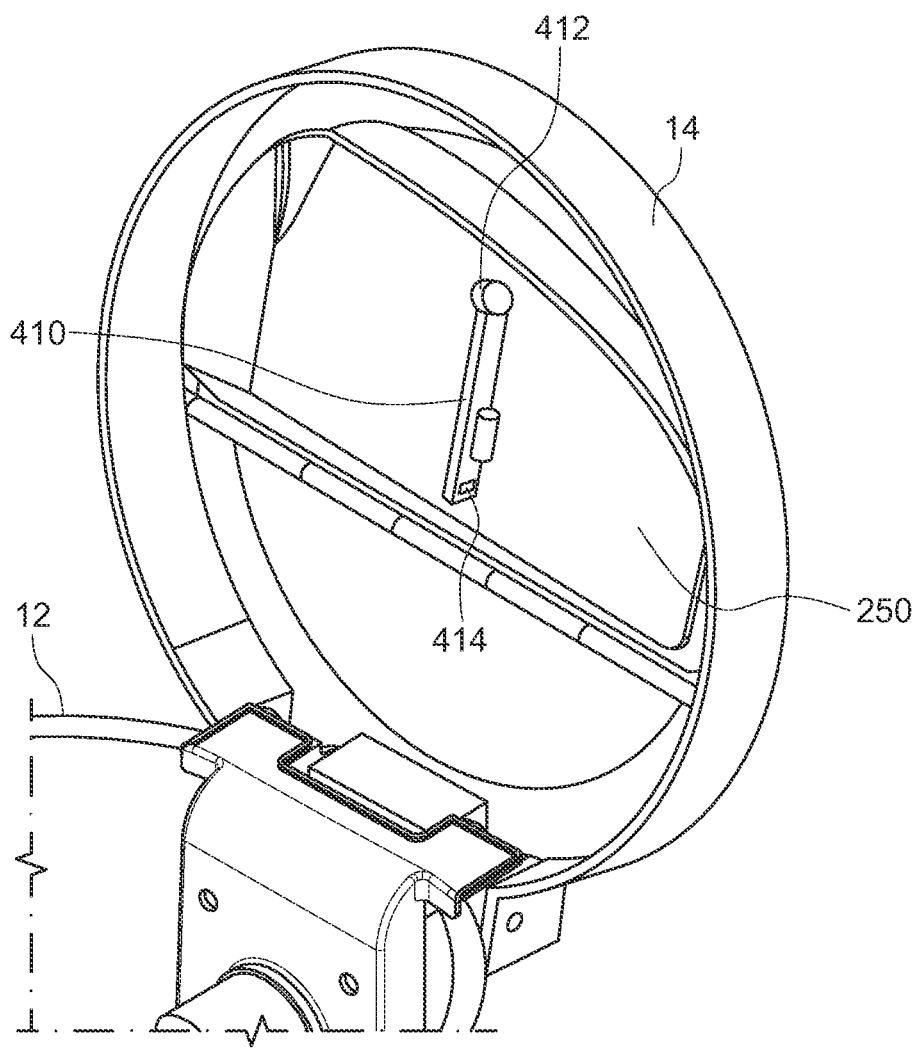
FIG. 33 is a front perspective view of a load line containment assembly including a lid support structure in a storage position.
Figure 34:
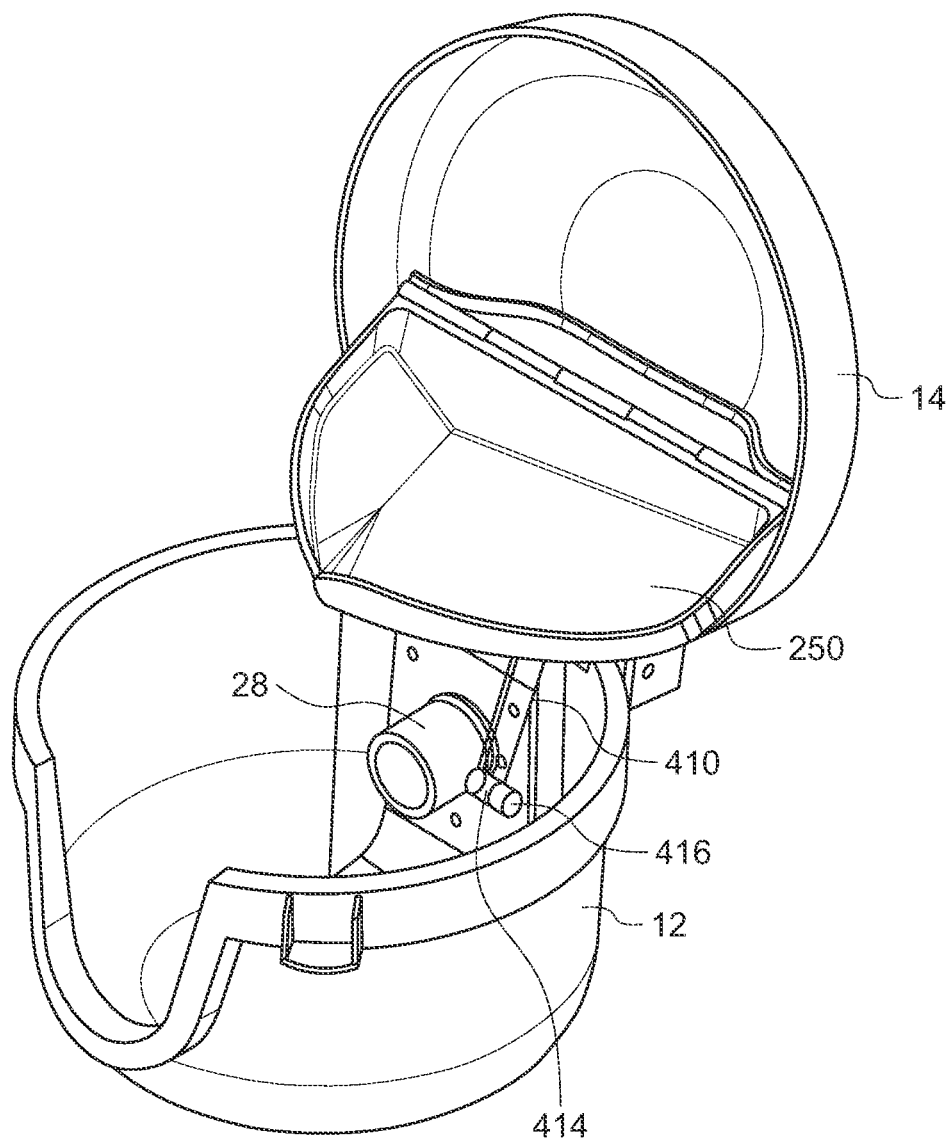
FIG. 34 is a front perspective view of the load line containment assembly of FIG. 33 with the lid support structure in a support position.
Figure 35:
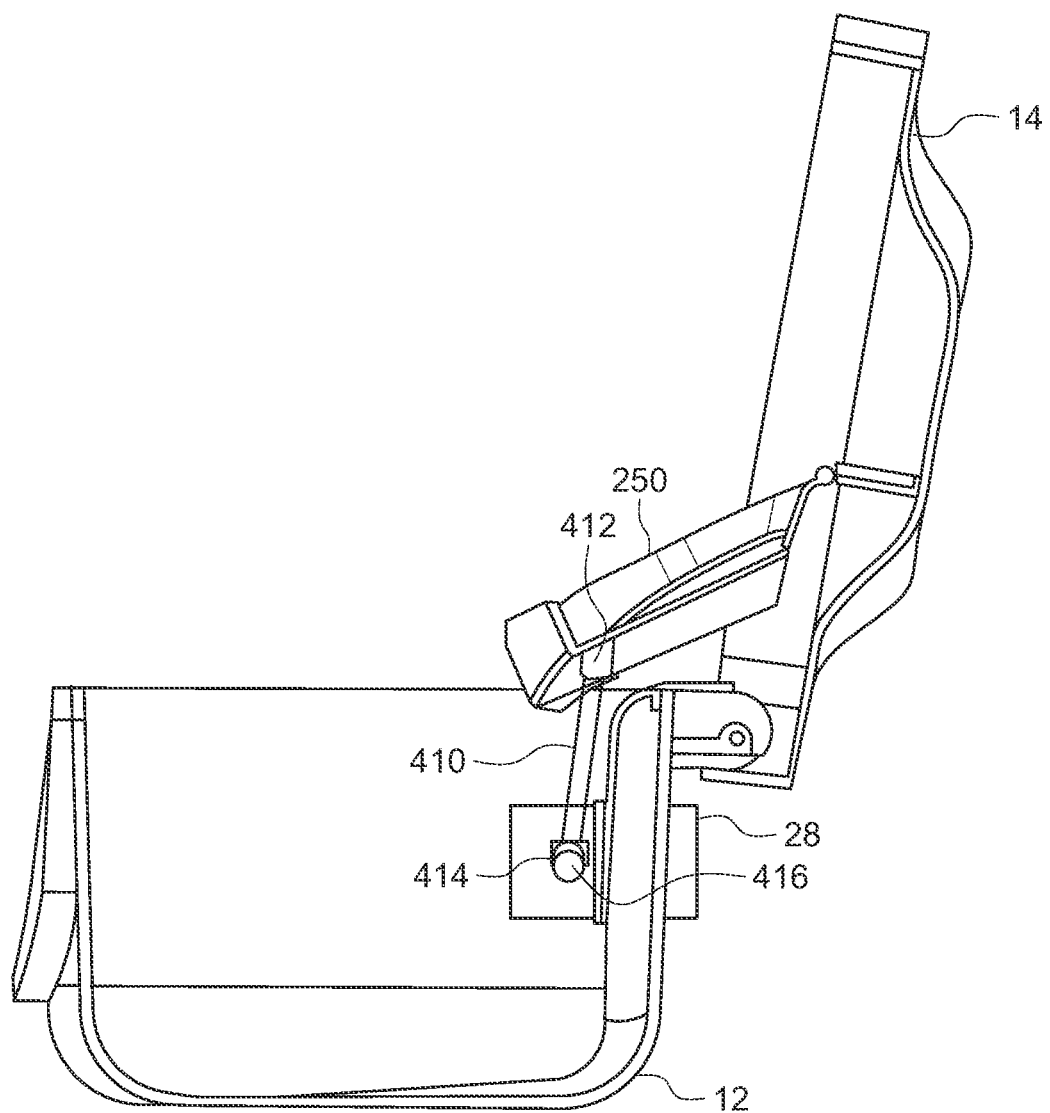
FIG. 35 is a side sectional view of the load line containment assembly of FIG. 33 with the lid support structure in a support position.

FIGS. 33-35 illustrate a further approach to supporting lid 14 in an open position. In the illustrated embodiment, a rod 410 is connected to a bottom of device 250. In a storage position illustrated in FIG. 33, the rod 410 is in a folded configuration parallel to a bottom surface of the device 250. Rod 410 is pivotally connected to the device 250 at a first end 412. To support lid 14, rod 410 is pivoted about first end 412 and a second end 414 is connected to the container 12. In the embodiment illustrated, a support structure 416 on the collar support 28.

Figure 36:
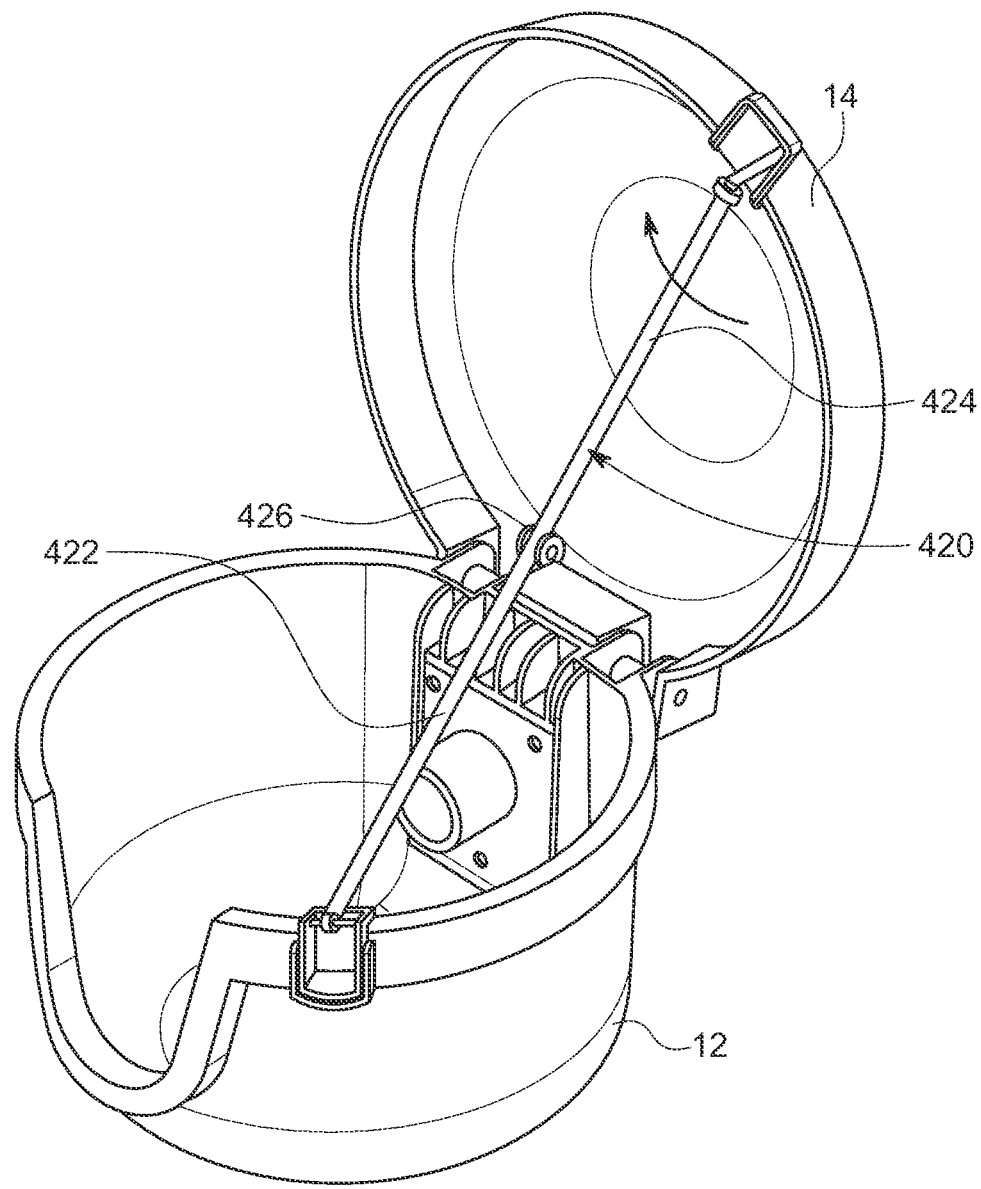
FIG. 36 is a front perspective view of a load line containment assembly with an alternative support structure in a support position.

FIG. 36 illustrates yet a further approach to supporting lid 14 in an open position using a rod 420 connected to a rim of the container 12 and a rim on the lid 14. The rod 420 is formed of a first segment 422 connected to the container 12 and a second segment 424 connected to the lid 14. The first and second segments 422, 424 are pivotally connected through a joint 426, which allows the rod 420 to be folded and stored within container 12 when not in use.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A tool storage device for use with a containment assembly having a container and a lid coupled with the container, the containment assembly operable in an open configuration and a closed configuration, the tool storage device comprising:
   a base component configured to be coupled to the lid;
   a tool support component coupled with the base component and configured to support a tool thereon when the containment assembly is in the open configuration; and
   a fluid delivery component pivotally coupled with the base component and positioned to direct fluid from the tool support component to the container.

2. The tool storage device of claim 1 wherein the fluid delivery component is configured to direct fluid into the container when the containment assembly is in the closed configuration.

3. The tool storage device of claim 1, wherein the base and fluid delivery component are formed of an integral body.

4. The tool storage device of claim 1, wherein the fluid delivery component includes a funnel to direct fluid into the container when the containment assembly is in the closed configuration.

5. The tool storage device of claim 1, wherein the fluid delivery component defines a lower wall and a perimeter wall, the lower wall and the perimeter wall extending from and being integral with the base component.

6. The tool storage device of claim 1, further comprising a first portion connected to the lid and a second portion pivotally connected to the first portion, the second portion including the fluid delivery component.

7. The tool storage device of claim 6, wherein the first portion is connected to the second portion through a living hinge.

8. The tool storage device of claim 1, wherein the fluid delivery component defines a funnel-like shape.

9. The tool storage device of claim 1, further comprising a hinge support portion connectable to a corresponding hinge support portion on the container.

10. The tool storage device of claim 1, further comprising a rod connectable to the container, the rod configured to maintain the containment assembly in the open configuration.

11. The tool storage device of claim 1, further comprising a sump.

12. The tool storage device of claim 11, wherein the tool support component is separate from the sump.

13. The tool storage device of claim 11, wherein the tool support component is fluidly connected to the sump.

14. A method of containing oil and/or waste spillage in a containment assembly having a container and a lid coupled with the container, the containment assembly operable in an open configuration and a closed configuration, the method comprising:
   providing a tool storage device comprising a base component, a tool support component and a fluid delivery component, wherein the tool support component is connected to the base component and configured to support a tool therein, wherein the fluid delivery component is connected to the base component and positioned to direct fluid from the tool support component to the container;
   connecting a rod to the lid to maintain the containment assembly in the open configuration; and
   coupling the tool storage device to the container.

15. The method of claim 14, further comprising:
   opening the lid;
   positioning a tool on the tool support component; and
   closing the lid, whereby oil and/or waste spillage from the tool is directed by the fluid delivery component into the container.

16. A containment assembly, comprising:
   a container;
   a lid pivotally connected to the container through a hinge and configured to be positioned in an open configuration and a closed configuration;
   a fluid delivery component connected to the lid such that, when the lid is in the open configuration, fluid on an interior of the lid and above the fluid delivery component is directed to the container.

17. The containment assembly of claim 16, further comprising a cover assembly, wherein the cover assembly includes a first portion extending over a collar support in the container and a second portion connected to the first portion and positioned over a hinge support portion of the container.

18. The containment assembly of claim 16, further comprising a reinforcement structure connected to a rear wall of the container, the rear wall defining a central aperture configured to support a supply line coupled with a collar support in the container.

19. The containment assembly of claim 16, further comprising a tool support component coupled with an interior of the lid, the tool support component configured to support a tool when the lid is in the open configuration.

\* \* \* \* \*